United States Patent
Rotvold et al.

(10) Patent No.: US 11,206,241 B2
(45) Date of Patent: Dec. 21, 2021

(54) PUBLISHING DATA ACROSS A DATA DIODE FOR SECURED PROCESS CONTROL COMMUNICATIONS

(71) Applicant: FISHER-ROSEMOUNT SYSTEMS, INC., Round Rock, TX (US)

(72) Inventors: Eric Rotvold, West Saint Paul, MN (US); Mark J. Nixon, Round Rock, TX (US)

(73) Assignee: FISHER-ROSEMOUNT SYSTEMS, INC., Round Rock, TX (US)

(*) Notice: Subject to any disclaimer, the term of this patent is extended or adjusted under 35 U.S.C. 154(b) by 58 days.

(21) Appl. No.: 16/682,649

(22) Filed: Nov. 13, 2019

(65) Prior Publication Data
US 2020/0084181 A1    Mar. 12, 2020

Related U.S. Application Data

(63) Continuation of application No. 15/332,622, filed on Oct. 24, 2016, now Pat. No. 10,530,748.

(51) Int. Cl.
H04L 29/06 (2006.01)

(52) U.S. Cl.
CPC .......... H04L 63/0209 (2013.01); H04L 63/10 (2013.01)

(58) Field of Classification Search
CPC .. H04L 63/2209; H04L 63/10; H04L 63/0209
See application file for complete search history.

(56) References Cited

U.S. PATENT DOCUMENTS

| 5,311,562 A | 5/1994 | Palusamy et al. |
| 6,754,601 B1 | 6/2004 | Eryurek et al. |

(Continued)

FOREIGN PATENT DOCUMENTS

| CN | 101682546 A | 3/2010 |
| CN | 102411681 A | 4/2012 |

(Continued)

OTHER PUBLICATIONS

Barker et al., "The Application of Data Diodes for Securely Connecting Nuclear Power Plant Safety Systems to the Corporate IT Network," 7th IET International Conference on System Safety (2012).

(Continued)

*Primary Examiner* — Mohammed Waliullah
(74) *Attorney, Agent, or Firm* — Marshall, Gerstein & Borun LLP

(57) ABSTRACT

To secure communications from a process plant across a unidirectional data diode to a remote system, a sending device at the plant end publishes data across the diode to a receiving device at the remote end. The publication of various data is respectively in accordance with context information (e.g., identification of data sources, respective expected rate of data generation/arrival, etc.) that is descriptive of data sources of the plant and that is recurrently provided by the sending device across the diode. A recurrence interval may be based on a tolerance for lost data or another characteristic of an application, service, or consumer of data at the remote system. The publishing may leverage an industrial communication protocol (e.g., HART-IP) and/ or a suitable general-purpose communication protocol (e.g., JSON).

22 Claims, 7 Drawing Sheets

(56) References Cited

U.S. PATENT DOCUMENTS

| | | | |
|---|---|---|---|
| 7,970,830 B2 | 6/2011 | Staggs et al. | |
| 8,068,504 B2 | 11/2011 | Brindle et al. | |
| 8,204,717 B2 | 6/2012 | McLaughlin et al. | |
| 8,555,381 B2 | 10/2013 | McLaughlin et al. | |
| 9,128,472 B2 | 9/2015 | Lawson et al. | |
| 9,143,563 B2 | 9/2015 | Pingel et al. | |
| 9,217,999 B2 | 12/2015 | Domke et al. | |
| 9,218,000 B2 | 12/2015 | McLaughlin et al. | |
| 9,218,470 B2 | 12/2015 | Domke et al. | |
| 9,244,042 B2 | 1/2016 | Rank | |
| 9,253,054 B2 | 2/2016 | Maturana et al. | |
| 9,256,222 B2 | 2/2016 | Blount et al. | |
| 9,274,518 B2 | 3/2016 | Pai et al. | |
| 9,292,012 B2 | 3/2016 | Sayyarrodsari et al. | |
| 9,304,511 B2 | 4/2016 | Blount et al. | |
| 9,363,336 B2 | 6/2016 | Lawson et al. | |
| 9,412,137 B2 | 8/2016 | McLaughlin et al. | |
| 9,413,852 B2 | 8/2016 | Lawson et al. | |
| 9,430,589 B2 | 8/2016 | Eitzman et al. | |
| 9,438,648 B2 | 9/2016 | Asenjo et al. | |
| 9,467,500 B2 | 10/2016 | Maturana et al. | |
| 9,477,936 B2 | 10/2016 | Lawson et al. | |
| 9,489,832 B2 | 11/2016 | Nair et al. | |
| 9,934,671 B1 | 4/2018 | Anderson | |
| 9,967,234 B1 | 5/2018 | Crane et al. | |
| 10,021,072 B2 | 7/2018 | Ishigaki et al. | |
| 10,257,163 B2 | 4/2019 | Rotvold et al. | |
| 10,270,745 B2 | 4/2019 | Rotvold et al. | |
| 10,530,748 B2 | 1/2020 | Rotvold et al. | |
| 11,073,805 B2 | 7/2021 | Neitzel et al. | |
| 2002/0087708 A1 | 7/2002 | Low et al. | |
| 2002/0161927 A1 | 10/2002 | Inoue et al. | |
| 2003/0005486 A1 | 1/2003 | Ridolfo et al. | |
| 2003/0088698 A1 | 5/2003 | Singh et al. | |
| 2004/0148135 A1 | 7/2004 | Balakrishnan et al. | |
| 2004/0186927 A1 | 9/2004 | Eryurek et al. | |
| 2005/0007249 A1 | 1/2005 | Eryurek et al. | |
| 2005/0060323 A1 | 3/2005 | Leung et al. | |
| 2005/0165939 A1 | 7/2005 | Nikunen et al. | |
| 2006/0020788 A1 | 1/2006 | Han et al. | |
| 2006/0241907 A1 | 10/2006 | Armstrong et al. | |
| 2007/0165591 A1 | 7/2007 | Higure et al. | |
| 2008/0016224 A1* | 1/2008 | Wan | H04L 45/123 709/227 |
| 2008/0082302 A1 | 4/2008 | Samardzija et al. | |
| 2008/0123852 A1 | 5/2008 | Jiang | |
| 2008/0183336 A1 | 7/2008 | Dykstra | |
| 2008/0208527 A1 | 8/2008 | Kavaklioglu | |
| 2008/0285487 A1* | 11/2008 | Forslow | H04L 65/4061 370/277 |
| 2009/0019169 A1 | 1/2009 | Li et al. | |
| 2010/0153969 A1 | 6/2010 | Dyba et al. | |
| 2010/0168931 A1 | 7/2010 | Nasle | |
| 2011/0231478 A1 | 9/2011 | Wheeler et al. | |
| 2012/0250517 A1 | 10/2012 | Saarimaki et al. | |
| 2013/0110274 A1 | 5/2013 | D'Mura et al. | |
| 2013/0117556 A1 | 5/2013 | Coleman et al. | |
| 2013/0185022 A1 | 7/2013 | Maehata et al. | |
| 2013/0211555 A1 | 8/2013 | Lawson et al. | |
| 2013/0212160 A1 | 8/2013 | Lawson et al. | |
| 2013/0212214 A1 | 8/2013 | Lawson et al. | |
| 2013/0223494 A1 | 8/2013 | Jensen et al. | |
| 2014/0068712 A1 | 3/2014 | Frenkel et al. | |
| 2014/0165182 A1 | 6/2014 | Curry et al. | |
| 2015/0104017 A1 | 4/2015 | Halford et al. | |
| 2015/0127876 A1* | 5/2015 | Erni | G05B 15/02 710/315 |
| 2015/0163198 A1 | 6/2015 | Moore et al. | |
| 2015/0180830 A1 | 6/2015 | Burnett et al. | |
| 2015/0195086 A1 | 7/2015 | Davison | |
| 2015/0264056 A1 | 9/2015 | Mevec et al. | |
| 2015/0281453 A1 | 10/2015 | Maturana et al. | |
| 2015/0295751 A1 | 10/2015 | Caison et al. | |
| 2015/0341469 A1 | 11/2015 | Lawson et al. | |
| 2015/0365512 A1 | 12/2015 | MacKenzie et al. | |
| 2016/0033369 A1 | 2/2016 | Lehofer et al. | |
| 2016/0044507 A1 | 2/2016 | Agiwal et al. | |
| 2016/0134501 A1 | 5/2016 | Timms | |
| 2016/0147206 A1* | 5/2016 | Neitzel | H04L 12/462 700/20 |
| 2016/0153806 A1 | 6/2016 | Ciasulli et al. | |
| 2016/0205133 A1 | 7/2016 | Mackey et al. | |
| 2016/0282859 A1 | 9/2016 | Wilber et al. | |
| 2016/0357175 A1 | 12/2016 | Verma | |
| 2017/0054687 A1* | 2/2017 | Ishigaki | H04L 63/0227 |
| 2017/0289104 A1 | 10/2017 | Shankar et al. | |
| 2017/0347264 A1 | 11/2017 | Holland et al. | |
| 2018/0032405 A1 | 2/2018 | Chen et al. | |
| 2018/0060604 A1 | 3/2018 | Bent et al. | |
| 2018/0112795 A1 | 4/2018 | Anderson | |

FOREIGN PATENT DOCUMENTS

| | | |
|---|---|---|
| EP | 2 660 667 A2 | 11/2013 |
| EP | 2 778 817 A1 | 9/2014 |
| EP | 2 924 571 A2 | 9/2015 |
| GB | 2 488 369 A | 8/2012 |
| GB | 2 505 297 A | 2/2014 |
| GB | 2 536 059 A | 9/2016 |
| JP | 2007-536647 A | 12/2007 |
| JP | 2011-021977 A | 2/2011 |
| JP | 2014-140096 A | 7/2014 |
| JP | 2015-133558 A | 7/2015 |
| JP | 2016-105591 A | 6/2016 |
| WO | WO-2004/074947 A2 | 9/2004 |
| WO | WO-2005/109122 A1 | 11/2005 |
| WO | WO-2010/079260 A1 | 7/2010 |
| WO | WO-2014/094982 A1 | 6/2014 |
| WO | WO-2017/030186 A1 | 2/2017 |

OTHER PUBLICATIONS

Boudreaux, M., "What a smart device ecosystem looks like," Plant Services (Mar. 8, 2016), http://www.plantservices.com/articles/2016/au-iiot-automation-zone-smart-device-ecosystem/, 6 pages.

Examination Report for GCC Application No. 2017/34159, dated Apr. 15, 2019.

Examination Report for GCC Application No. 2017/34160, dated Apr. 21, 2019.

Kelson, "The HART )RTM) Protocol—A Solution Enabling Technology," (2013).

International Search Report and Written Opinion for Application No. PCT/US2017/057145, dated Jan. 30, 2018.

International Search Report for Application No. PCT/US2017/057162, dated Mar. 26, 2018.

Mintchell, G., "Plethora of Protocols," The Manufacturing Connection (Mar. 22, 2016), http://themanufacturingconnection.com/2016/03/plethora-of-protocols/, 3 pages.

Obregon, L., "Secure architecture for industrial control systems," The SANS Institute (2015), 27 pages.

Press Release: Dell Teams with GE, Microsoft, OSIsoft, PTC, SAP, Software AG and Others to Advance the Internet of Things, Dell (Apr. 19, 2016), http://www.dell.com/learn/US/en/uscorp1/press-releases/2016-04-19-dell-teams-with-ge-microsoft-oslsoft-sap-software-ag-and-others, 3 pages.

Resnick, C., "OPC Foundation Announces OPC UA Open Source Availability, Support of Publish/Subscribe, and Collaborative Strategy with OMG," ARC Advisory Group (Apr. 6, 2016), http://www.arcweb.com/blog/post/1095, 2 pages.

Search Report for Application No. GB1717357.6, dated Apr. 18, 2018.

Search Report for Application No. GB1717365.9, dated Apr. 18, 2018.

Search Report for Application No. GB1717366.7, dated Apr. 18, 2018.

Search Report for Application No. GB1717368.3, dated Feb. 26, 2018.

Technical Overview: How does a data diode work?, Advenica AB (accessed Oct. 19, 2016), https://www.advenica.com/en/cds/securicds-data-diode/technical-overview, 3 pages.

(56) References Cited

OTHER PUBLICATIONS

Uniformance Asset Sentinel Brochure, Honeywell International Inc. (2015), https://www.honeywellprocess.com/library/marketing/brochure/uniformance-asset-sentinel-brochure.pdf, 8 pages.
Written Opinion for International Application No. PCT/US2017/057162, dated Mar. 26, 2018.
Notification of the First Office Action for Chinese Application No. 201711002871.7, dated Aug. 21, 2020.
Notice of Reasons for Rejection for Japanese Application No. 2017-205478, dated Aug. 17, 2021.
Notice of Reasons for Rejection for Japanese Application No. 2017-205470, dated Aug. 31, 2021.
Notice of Reasons for Rejection for Japanese Application No. 2017-205479, dated Oct. 5, 2021.
Examination Report for Application No. GB1717357.6, dated Aug. 17, 2021.
Examination Report for Application No. GB1717365.9, dated Aug. 17, 2021.
Examination Report for Application No. GB1717366.7, dated Aug. 17, 2021.

* cited by examiner

PUBLISHING DATA ACROSS A DATA DIODE FOR SECURED PROCESS CONTROL COMMUNICATIONS

RELATED REFERENCES

The present disclosure claims priority to and the benefit of U.S. patent application Ser. No. 15/332,622, filed Oct. 24, 2016 and entitled "Publishing Data Across a Data Diode for Secured Process Communications." Additionally, the present disclosure is related to co-owned U.S. patent application Ser. No. 14/507,188, filed Oct. 6, 2014 and entitled "Regional Big Data in Process Control Systems", which issued as U.S. Pat. No. 9,823,626; co-owned U.S. patent application Ser. No. 15/274,519, filed Sep. 23, 2016 and entitled "Data Analytics Services for Distributed Industrial Performance Monitoring"; U.S. patent application Ser. No. 15/274,233, filed Sep. 23, 2016 and entitled "Distributed Industrial Performance Monitoring and Analytics"; and co-owned U.S. patent application Ser. No. 15/332,521, filed Oct. 24, 2016 and entitled "Process Device Condition and Performance Monitoring", the entire disclosures of which are hereby incorporated by reference herein.

TECHNICAL FIELD

The present disclosure relates generally to process plants and to process control systems, and more particularly, to the securing communications between local process plants/process control systems and a remote system servicing the local process control plants/systems, such as a pervasive sensing system.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters such as pressure, temperature, etc., and the like to control one or more process executing within the process plant or system. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, a process control system of a process plant includes field devices, controllers, workstations, and other devices that are interconnected by a set of layered networks and buses. The process control system may, be in turn, be connected with various business and external networks, e.g., to reduce manufacturing and operational costs, enhance productivity and efficiencies, provide timely access to process control and/or process plant information, etc. On the other hand, the interconnection of process plants and/or process control systems to enterprise and/or external networks and systems increases the risk of cyber intrusions and/or malicious cyber attacks that may arise from expected vulnerabilities in commercial systems and applications, such as those used in enterprise and/or external networks. Cyber intrusions and malicious cyber attacks of process plants, networks, and/or control systems may negatively affect the confidentiality, integrity, and/or availability of information assets, which, generally speaking, are vulnerabilities similar to those of general purpose computing networks. However, unlike general purpose computer networks, cyber intrusions of process plants, networks, and/or control systems may also lead to damage, destruction, and/or loss of not only plant equipment, product, and other physical assets, but also to the loss of human life. For example, a cyber intrusion may cause a process to become uncontrolled, and thereby produce explosions, fires, floods, exposure to hazardous materials, etc. Thus, securing communications related to process control plants and systems is of paramount importance.

FIG. 1 includes a block diagram 10 of example levels of security for a process control or industrial process system. The diagram 10 depicts interconnections between various components of the process control system, the process control system itself, and other systems and/or networks to which the process control system may communicatively connect, as well as layers or levels of security relating to communications in and between the process control system and the other systems/networks. The security levels provide a layered approach to security via segmentation or separation, and various levels are protected by one or more firewalls 12A, 12B, 12C to allow only authorized traffic between the different levels. In FIG. 1, the lower-numbered security levels are closer to the on-line process that is being controlled, while the higher-numbered security levels are more removed from the executing process. Accordingly, trust levels (e.g., a relative degree of trust in the safety and validity of messages, packets, and other communications) are the highest at the device level (Level 0), and trust levels are the lowest above the business network level (Level 5), e.g., on the public Internet and/or other public networks. Using the Purdue Model for Control Hierarchy logical framework standardized by ISA (International Society of Automation) 95.01—IEC (International Electrotechnical Commission) 62264-1, process control systems generally fall into Security Levels 0-2, and manufacturing, corporate, and enterprise systems generally fall into Security Levels 3-5.

Examples of different functionalities at each of the different security levels are shown in FIG. 1. Typically, Level 0 includes field devices and other devices that are disposed within a process plant and that have direct contact with the process and/or process flow, for example, sensors, valves, valve positioners, switches, transmitters, and other devices that perform physical and/or process control functions such as opening or closing valves, measuring process parameters such as pressure, temperature, etc., and the like. For clarity of illustration, example field devices are not shown in FIG. 1.

Level 1 includes controllers and other process control devices 15A-15D that provide basic control of real-time operations of the process, e.g., by receiving input from field devices, processing the input using control schemes, modules, or other logic, and sending resultant output to other devices. Generally, such process control devices are programmed and/or configured with respective control schemes. For example, process control devices at Level 1 may include process controllers, programmable logic controllers (PLCs), Remote Terminal Units (RTUs), and the like. As shown in FIG. 1, the process control devices at Level 1 may include those that perform batch control 15A, discrete control 15B, continuous control 15C, hybrid control 15D, and/or other types of control.

Level 2 includes devices and equipment 18A-18D that provide production area supervisory control for the process plant. For example, Level 2 may include alarming and/or alerting systems 18A, operator workstations 18C, other Human Machine Interfaces (HMIs) 18B, 18D, and the like. Generally, Level 2 devices and equipment may communicate with Level 1 devices 15A-15D, as well as with Level 3 devices and equipment, e.g., via one or more firewalls 12A, 12B.

Level 3 houses plant systems and/or networks, e.g., the devices, equipment, and systems 20A-20D that manage site/plant operations and control to produce or manufacture a desired end product. For example, Level 3 may include production systems 20A that are used for production control, reporting, scheduling, etc.; optimization systems 20B that are used for improving quality, productivity, efficiencies, etc.; historians 20C for historizing data generated by and/or indicative of the process plant; and/or engineering workstations or computing devices 20D used by personnel for design and development of control schemes and modules, operator workstation and/or HMI interfaces, etc.

Skipping to Level 5, Level 5 generally houses business, corporate, or enterprise systems and/or networks. Typically, such systems and/or networks manage the interfacing with systems outside of the enterprise. For example, an enterprise's VPN (Virtual Private Network), corporate or enterprise Internet access services, and/or other IT (Information Technology) infrastructure systems and applications may be found in Level 5.

Level 4, which may be viewed as an inward extension of Level 5, generally houses corporate or enterprise systems that are internal to the enterprise, for example, corporate systems that support email, intranet, site business planning and logistics, inventory, scheduling, and/or other corporate/enterprise systems and networks.

As shown in FIG. 1, Security Levels 3 and 4 interface with each other across a demilitarized zone (DMZ) 22 that separates business or enterprise systems and/or networks from plant/process systems and/or networks, thereby minimizing the level of security risk to which a process plant is exposed. The DMZ 22 may include one or more respective firewalls 12C, and may house various devices, equipment, servers, and/or applications 25A-25F that communicate with plant-related devices, equipment, and applications at lower security levels, and/or that communicate with enterprise-related devices, equipment, and applications at higher security levels. For example, the DMZ 22 may house Terminal Services 25A, Patch Management 25B, one or more AV Servers 25C, one or more Historians 25D (which may include mirror historians, for example), Web Services Operations 25E, and/or one or more Application Servers 25F, to name a few. Typically, for the devices, equipment, and/or applications at security levels above the DMZ 22, only those that are authorized are allowed to communicatively access the process plant, and further are required to connect via the devices, equipment, servers, and/or applications 25A-25F of the DMZ 22. The DMZ devices 25A-25F, in turn, maintain separate connections to the lower levels, thereby protecting the process plant and control system from attacks from the enterprise (and higher) systems and/or networks.

Turning now to a brief discussion of remote services, remote services are becoming more and more commonly used by different users and systems. For example, the Remote Desktop Services product provided by the Microsoft Windows® operating system enables users to access session-based desktops, virtual machine-based desktops, or and/or other applications in a data center from a corporate network and/or from the Internet. The QuickBooks® Online product provided by Intuit® enables users to perform accounting functions such as cash flow management, issuing invoices, and making payments online via the Internet. Generally speaking, remote services are provided by one or more applications that execute remotely from the system or user that accesses the remote service. For example, the one or more applications execute and manage data at a remote bank of servers, in the cloud, etc., and are accessed via one or more private and/or public networks, such as an enterprise network and/or the public Internet.

SUMMARY

In an embodiment, a method for securely transporting communications from a process plant to another system includes: at a field gateway interconnecting a network of the process plant and a data diode configured to prevent two-way communications between the field gateway and an edge gateway, recurrently announcing, to the edge gateway across the data diode, respective context information descriptive of each of one or more devices of the process control plant; receiving, at the field gateway via the process plant network, data generated by the each of the one or more devices while the process plant operates to control a process; and publishing, by the field gateway to the edge gateway across the data diode, the process plant data.

In an embodiment, a system for securely transporting communications from a process plant to another system includes a field gateway communicatively coupled to a network of the process plant; an edge gateway communicatively coupled to the other system; and a data diode interconnecting the field gateway and the edge gateway. The data diode is configured to prevent communications transmitted by the edge gateway from being ingressed into the field gateway, and data generated by one or more devices included in the process plant while the process plant is operating to control an industrial process is received at the field gateway via the process plant network, and is published, by the field gateway, across the data diode to the edge gateway.

DETAILED DESCRIPTION

As discussed above, securing process control plants and systems against cyber intrusions and malicious cyber attacks typically utilizes a layered or leveled security hierarchy, with at least some of the layers or levels secured by using firewalls and other security mechanisms. For example, as previously discussed with respect to FIG. 1, process plant systems, networks, and devices at Security Levels 0-3 may be protected against threats from enterprise networks at Security Levels 4-5, and/or from any external networks higher than Level 5 exploiting the enterprise networks, e.g., by using a DMZ 22 and one or more firewalls 12A-12C. However, as more and more services and applications that operate on process plant data are moved to execute remotely, e.g., on networks and systems outside of the process plant (e.g., at Levels 4 and/or 5 within the enterprise or business), and/or even on networks and systems that are external to the enterprise or business (e.g., above Level 5, via the Internet or other public network), stronger techniques for preventing process plant systems, networks, and devices from being compromised are needed.

The novel systems, components, apparatuses, methods, and techniques described herein address these and other security issues related to process plants and their networks, and in particular are directed to securing communications between process plants/networks and other networks or systems.

Figure 2:
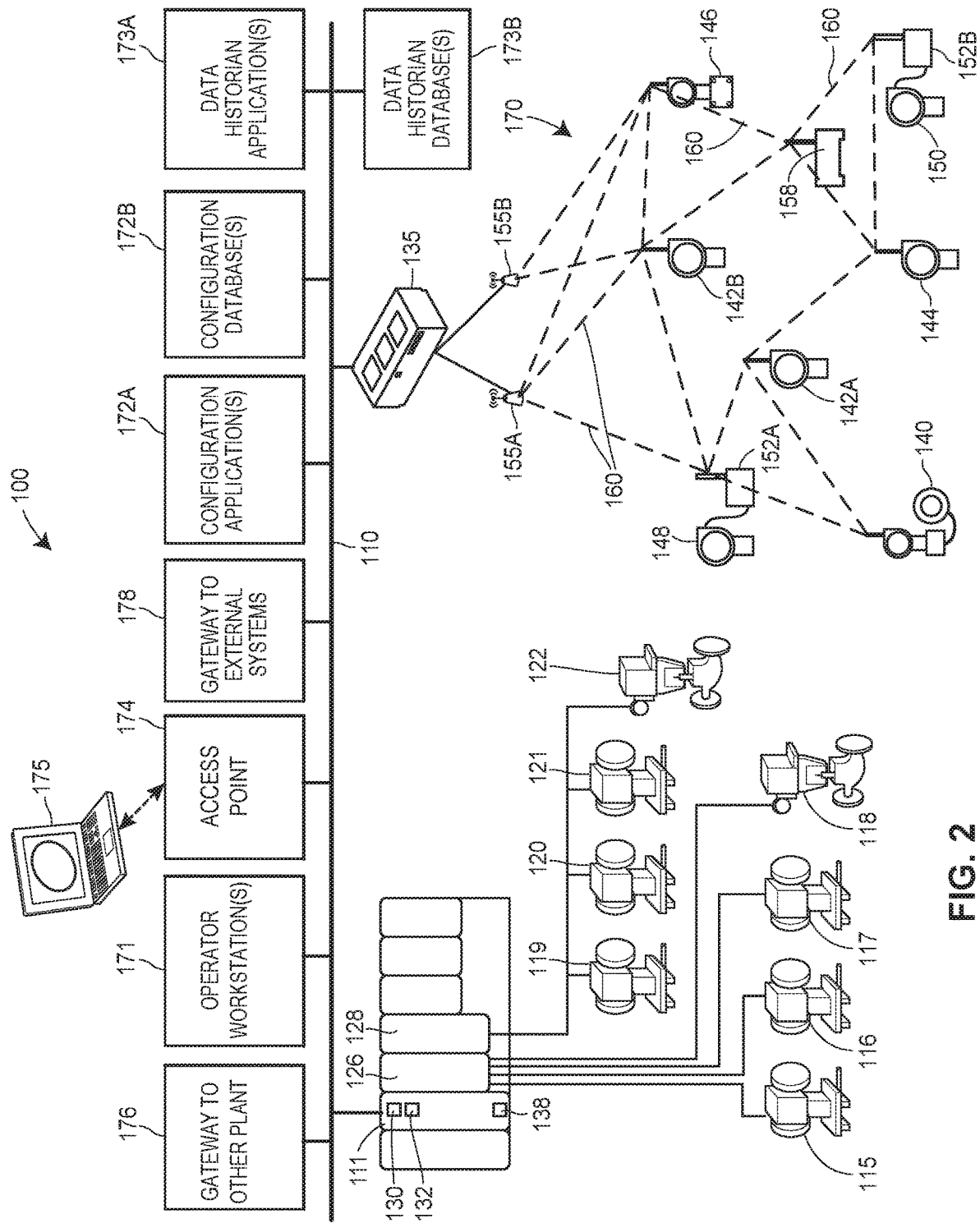
FIG. 2 is a block diagram of an example process plant or process control system, that illustrates, inter alia, interconnections between various example components of the process control system, the process control system itself, and other example systems and/or networks.

To illustrate, FIG. 2 is a block diagram of an example process plant 100 which is configured to control an industrial process during on-line operations, and which may be secured utilizing any one or more of the novel security techniques described herein. The process plant 100 (which is also interchangeably referred to herein as a process control system 100 or process control environment 100) includes one or more process controllers that receive signals indicative of process measurements made by field devices, process this information to implement a control routine, and generate control signals that are sent over wired or wireless process control communication links or networks to other field devices to control the operation of a process in the plant 100. Typically, at least one field device performs a physical function (e.g., opening or closing a valve, increasing or decreasing a temperature, taking a measurement, sensing a condition, etc.) to control the operation of a process. Some types of field devices communicate with controllers by using I/O devices. Process controllers, field devices, and I/O devices may be wired or wireless, and any number and combination of wired and wireless process controllers, field devices and I/O devices may be included in the process plant environment or system 100.

For example, FIG. 2 illustrates a process controller 111 that is communicatively connected to wired field devices 115-122 via input/output (I/O) cards 126 and 128, and that is communicatively connected to wireless field devices 140-146 via a wireless gateway 135 and a process control data highway or backbone 110. The process control data highway 110 may include one or more wired and/or wireless communication links, and may be implemented using any desired or suitable or communication protocol such as, for example, an Ethernet protocol. In some configurations (not shown), the controller 111 may be communicatively connected to the wireless gateway 135 using one or more communications networks other than the backbone 110, such as by using any number of other wired or wireless communication links that support one or more communication protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, Profibus, FOUNDATION® Fieldbus, etc.

The controller 111, which may be, by way of example, the DeltaV™ controller sold by Emerson Process Management, may operate to implement a batch process or a continuous process using at least some of the field devices 115-122 and 140-146. In an embodiment, in addition to being communicatively connected to the process control data highway 110, the controller 111 is also communicatively connected to at least some of the field devices 115-122 and 140-146 using any desired hardware and software associated with, for example, standard 4-20 mA devices, I/O cards 126, 128, and/or any smart communication protocol such as the FOUNDATION® Fieldbus protocol, the HART® protocol, the WirelessHART® protocol, etc. In FIG. 2, the controller 111, the field devices 115-122 and the I/O cards 126, 128 are wired devices, and the field devices 140-146 are wireless field devices. Of course, the wired field devices 115-122 and wireless field devices 140-146 could conform to any other desired standard(s) or protocols, such as any wired or wireless protocols, including any standards or protocols developed in the future.

The process controller 111 of FIG. 2 includes a processor 130 that implements or oversees one or more process control routines 138 (e.g., that are stored in a memory 132). The processor 130 is configured to communicate with the field devices 115-122 and 140-146 and with other nodes that are communicatively connected to the controller 111. It should be noted that any control routines or modules described herein may have parts thereof implemented or executed by different controllers or other devices if so desired. Likewise, the control routines or modules 138 described herein which are to be implemented within the process control system 100 may take any form, including software, firmware, hardware, etc. Control routines may be implemented in any desired software format, such as using object oriented programming, ladder logic, sequential function charts, function block diagrams, or using any other software programming language or design paradigm. The control routines 138 may be stored in any desired type of memory 132, such as random access memory (RAM), or read only memory (ROM). Likewise, the control routines 138 may be hard-coded into, for example, one or more EPROMs, EEPROMs, application specific integrated circuits (ASICs), or any other hardware or firmware elements. Thus, the controller 111 may be configured to implement a control strategy or control routine in any desired manner.

The controller 111 implements a control strategy using what are commonly referred to as function blocks, where each function block is an object or other part (e.g., a subroutine) of an overall control routine and operates in conjunction with other function blocks (via communications called links) to implement process control loops within the process control system 100. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system 100. Of course, hybrid and other types of function blocks exist. Function blocks may be stored in and executed by the controller 111, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 111 may include one or more control routines 138 that may implement one or more control loops which are performed by executing one or more of the function blocks.

The wired field devices 115-122 may be any types of devices, such as sensors, valves, transmitters, positioners, etc., while the I/O cards 126 and 128 may be any types of I/O devices conforming to any desired communication or controller protocol. In FIG. 2, the field devices 115-118 are standard 4-20 mA devices or HART® devices that communicate over analog lines or combined analog and digital lines to the I/O card 126, while the field devices 119-122 are smart devices, such as FOUNDATION® Fieldbus field devices, that communicate over a digital bus to the I/O card 128 using a FOUNDATION® Fieldbus communications protocol. In some embodiments, though, at least some of the wired field devices 115, 116 and 118-121 and/or at least some of the I/O cards 126, 128 additionally or alternatively communicate with the controller 111 using the process control data highway 110 and/or by using other suitable control system protocols (e.g., Profibus, DeviceNet, Foundation Fieldbus, ControlNet, Modbus, HART, etc.).

In FIG. 2, the wireless field devices 140-146 communicate via a wireless process control communication network 170 using a wireless protocol, such as the WirelessHART® protocol. Such wireless field devices 140-146 may directly communicate with one or more other devices or nodes of the wireless network 170 that are also configured to communicate wirelessly (using the wireless protocol or another wireless protocol, for example). To communicate with other nodes that are not configured to communicate wirelessly, the wireless field devices 140-146 may utilize a wireless gateway 135 connected to the process control data highway 110 or to another process control communications network. The wireless gateway 135 provides access to various wireless devices 140-158 of the wireless communications network 170. In particular, the wireless gateway 135 provides communicative coupling between the wireless devices 140-158, the wired devices 115-128, and/or other nodes or devices of the process control plant 100. For example, the wireless gateway 135 may provide communicative coupling by using the process control data highway 110 and/or by using one or more other communications networks of the process plant 100.

Similar to the wired field devices 115-122, the wireless field devices 140-146 of the wireless network 170 perform physical control functions within the process plant 100, e.g., opening or closing valves, or taking measurements of process parameters. The wireless field devices 140-146, however, are configured to communicate using the wireless protocol of the network 170. As such, the wireless field devices 140-146, the wireless gateway 135, and other wireless nodes 152-158 of the wireless network 170 are producers and consumers of wireless communication packets.

In some configurations of the process plant 100, the wireless network 170 includes non-wireless devices. For example, in FIG. 2, a field device 148 of FIG. 2 is a legacy 4-20 mA device and a field device 150 is a wired HART® device. To communicate within the network 170, the field devices 148 and 150 are connected to the wireless communications network 170 via a respective wireless adaptor 152A, 152B. The wireless adaptors 152A, 152B support a wireless protocol, such as WirelessHART, and may also support one or more other communication protocols such as Foundation® Fieldbus, PROFIBUS, DeviceNet, etc. Additionally, in some configurations, the wireless network 170 includes one or more network access points 155A, 155B, which may be separate physical devices in wired communication with the wireless gateway 135, or may be provided with the wireless gateway 135 as an integral device. The wireless network 170 may also include one or more routers 158 to forward packets from one wireless device to another wireless device within the wireless communications network 170. In FIG. 2, the wireless devices 140-146 and 152-158 communicate with each other and with the wireless gateway 135 over wireless links 160 of the wireless communications network 170, and/or via the process control data highway 110.

In FIG. 2, the process control system 100 includes one or more operator workstations 171 that are communicatively connected to the data highway 110. Via the operator workstations 171, operators may view and monitor run-time operations of the process plant 100, as well as take any diagnostic, corrective, maintenance, and/or other actions that may be required. At least some of the operator workstations 171 may be located at various, protected areas in or near the plant 100, e.g., in a back-end environment of the plant 100, and in some situations, at least some of the operator workstations 171 may be remotely located, but nonetheless in communicative connection with the plant 100. Operator workstations 171 may be wired or wireless computing devices.

The example process control system 100 is further illustrated as including a configuration application 172A and configuration database 172B, each of which is also communicatively connected to the data highway 110. As discussed above, various instances of the configuration application 172A may execute on one or more computing devices (not shown) to enable users to create or change process control modules and download these modules via the data highway 110 to the controllers 111, as well as enable users to create or change operator interfaces via which in operator is able to view data and change data settings within process control routines. The configuration database 172B stores the created (e.g., configured) modules and/or operator interfaces. Generally, the configuration application 172A and configuration database 172B are centralized and have a unitary logical appearance to the process control system 100, although multiple instances of the configuration application 172A may execute simultaneously within the process control system 100, and the configuration database 172B may be implemented across multiple physical data storage devices. Accordingly, the configuration application 172A, configuration database 172B, and user interfaces thereto (not shown) comprise a configuration or development system 172 for control and/or display modules. Typically, but not necessarily, the user interfaces for the configuration system 172 are different than the operator workstations 171, as the user interfaces for the configuration system 172 are utilized by configuration and development engineers irrespective of whether or not the plant 100 is operating in real-time, whereas the operator workstations 171 are utilized by operators during real-time operations of the process plant 100 (also referred to interchangeably here as "run-time" operations of the process plant 100).

The example process control system 100 includes a data historian application 173A and data historian database 173B, each of which is also communicatively connected to the data highway 110. The data historian application 173A operates to collect some or all of the data provided across the data highway 110, and to historize or store the data in the historian database 173B for long term storage. Similar to the configuration application 172A and configuration database 172B, the data historian application 173A and historian database 173B are centralized and have a unitary logical appearance to the process control system 100, although multiple instances of a data historian application 173A may execute simultaneously within the process control system 100, and the data historian 173B may be implemented across multiple physical data storage devices.

In some configurations, the process control system 100 includes one or more other wireless access points 174 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 174 allow handheld or other portable computing devices (e.g., user interface devices 175) to communicate over a respective wireless process control communication network that is different from the wireless network 170 and that supports a different wireless protocol than the wireless network 170. For example, a wireless or portable user interface device 175 may be a mobile workstation or diagnostic test equipment that is utilized by an operator within the process plant 100 (e.g., an instance of one of the operator workstations 171). In some scenarios, in addition to portable computing devices, one or more process control devices (e.g., controller 111, field devices 115-122, or wireless devices 135, 140-158) also communicate using the wireless protocol supported by the access points 174.

In some configurations, the process control system 100 includes one or more gateways 176, 178 to systems that are external to the immediate process control system 100. Typically, such systems are customers or suppliers of information generated or operated on by the process control system 100. For example, the process control plant 100 may include a gateway node 176 to communicatively connect the immediate process plant 100 with another process plant. Additionally or alternatively, the process control plant 100 may include a gateway node 178 to communicatively connect the immediate process plant 100 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 2 only illustrates a single controller 111 with a finite number of field devices 115-122 and 140-146, wireless gateways 35, wireless adaptors 152, access points 155, routers 1158, and wireless process control communications networks 170 included in the example process plant 100, this is only an illustrative and non-limiting embodiment. Any number of controllers 111 may be included in the process control plant or system 100, and any of the controllers 111 may communicate with any number of wired or wireless devices and networks 115-122, 140-146, 135, 152, 155, 158 and 170 to control a process in the plant 100.

Figure 1:
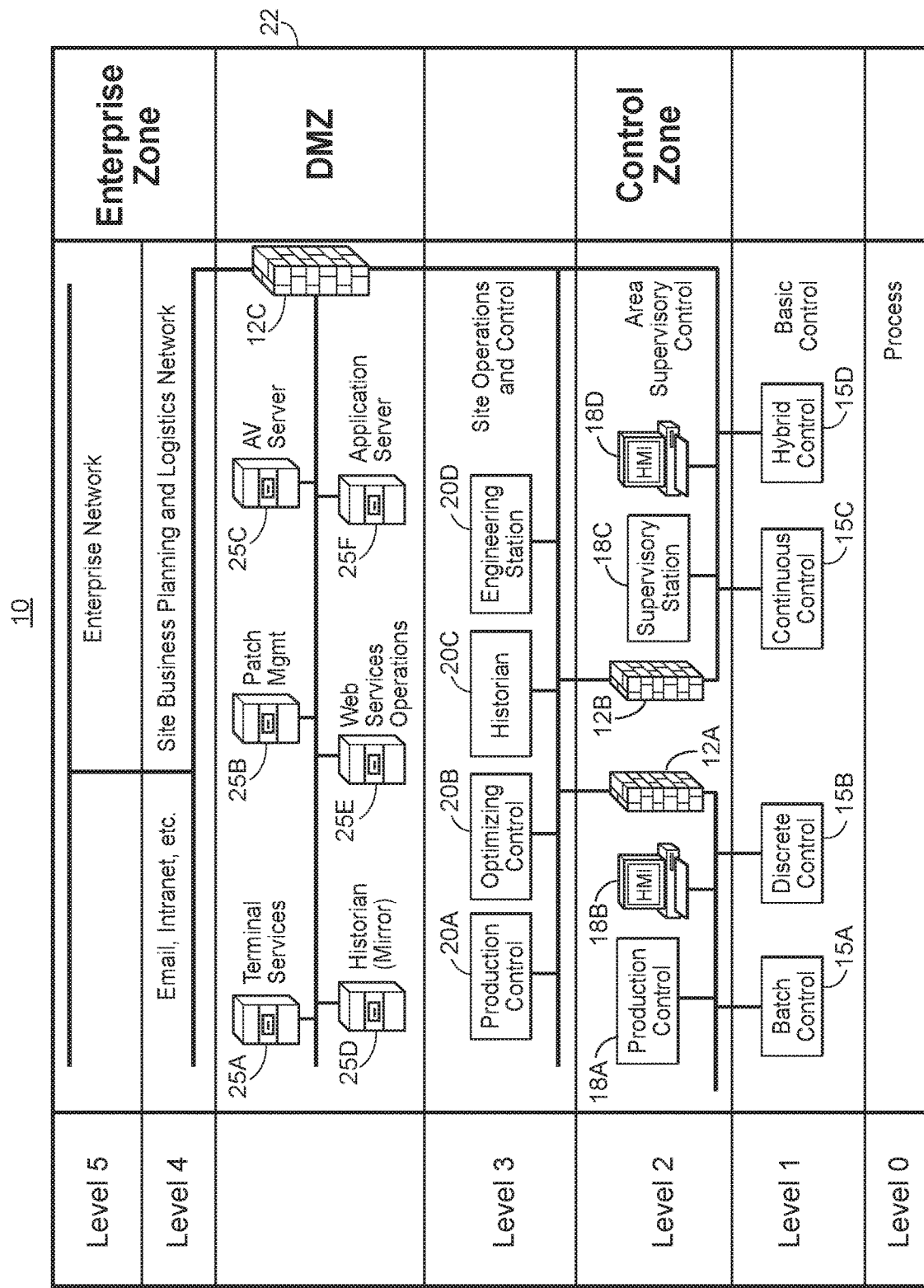
FIG. 1 includes a block diagram of example levels of security for a process control or industrial process system, including, inter alia, interconnections between various example components of the process control system, the process control system itself, and other example systems and/or networks.
Figure 3:
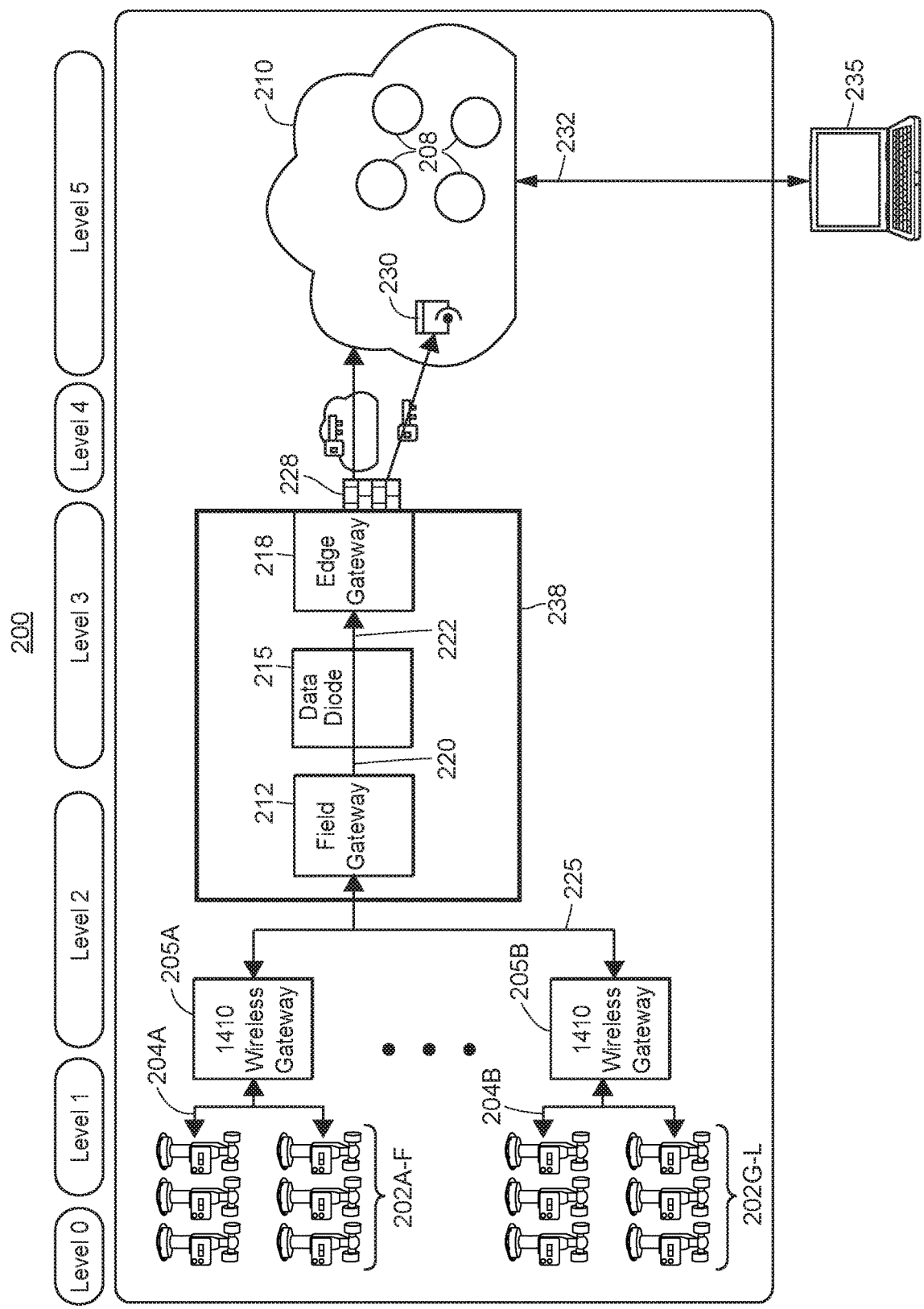
FIG. 3 is a block diagram of an example security architecture for a process plant or process control system.

FIG. 3 illustrates a block diagram of an example security architecture 200 for the example process plant 100 of FIG. 1. For reference, the various levels of security 0-5 from FIG. 1 are depicted across the top of FIG. 3 to indicate in which security levels various portions of the security architecture 200 may be included, however, this reference is merely a guideline as various portions of the security architecture 200 may be housed in security levels different than that depicted in FIG. 3.

As shown in FIG. 3, one or more devices 202 are communicatively connected to one or more wireless gateways 205A, 205B which, for example, may be instances of the wireless gateway 135 of FIG. 1. As previously discussed, the wireless gateways 205A, 205B may be located at Security Level 1 and/or Security Level 2, e.g., within the process plant 100 itself. The communicative connections between the gateways 205A, 205B and the devices 202 are denoted by the references 204A, 204B.

The set of devices 202 is illustrated as being at security Level 0 of the process plant 100, and is depicted as comprising a finite number of wireless field devices. However, it is understood that the concepts and features described herein with respect to the devices 202 may be easily applied to any number of field devices of the process plant 100, as well as to any types of field devices. For example, the field devices 202 may include one or more of the wired field devices 115-122 that are communicatively connected to the wireless gateways 205A, 205B via one or more wired communication networks 110 of the process plant 100, and/or the field devices 202 may include the wired field devices 148, 150 that are coupled to wireless adaptors 152A, 152B and thereby to the wireless gateways 205A, 205B.

Further, it is understood that the set of devices 202 is not limited to only field devices that generate process data, but may additionally or alternatively include any device or component within the process plant 100 that generates data as a result of the process plant 100 controlling the on-line process. For example, the set of devices 202 may include a diagnostic device or component that generates diagnostic data, a network routing device or component that transmits information between various components and/or devices of the process plant 100, and the like. Indeed, any one or more of the components shown in FIG. 2 (e.g., components 111, 115-122, 126, 128, 135, 140-146, 152, 155, 158, 160, 170, 171-176, 178) and other components that are not shown in FIG. 2 may be a device or component 202 that generates data for delivery to the remote system 210. As such, the set of devices 202 is referred to interchangeably herein as "data sources 202" or "data source devices 202."

FIG. 3 further illustrates a set of remote applications or services 208 that may be utilized with respect to the process plant 100 and/or that the process plant 100 utilizes. The set of remote applications or services 208 may execute or be hosted at one or more remote systems 210, and the set of remote applications/services 208 are considered to be at Security Level 5 or above, generally speaking. At least some of the applications or services 208 operate in real-time on real-time data as the real-time data is generated by the process plant 100 and received by the applications or services 208. Other applications or services 208 may operate or execute on process plant-generated data with less stringent timing requirements. Examples of applications/services 208 that may execute or be hosted at the remote system 210 and that are consumers of data generated by the process plant 100 include applications that monitor and/or sense conditions and/or events occurring at the process plant 100, and applications or services that monitor at least a portion of the on-line process itself as it is executing at the process plant 100. Other examples of applications/services 208 include descriptive and/or prescriptive analytics, which may operate on data generated by the process plant 100 and, in some cases, may operate on knowledge gleaned or discovered from analyzing the process plant-generated data, as well as on data generated by and received from other process plants. Still other examples of applications/services 208 include one or more routines that implement prescriptive functions, modification of configurations and/or other data, and/or other prescriptive changes that are to be implemented back into the process plant 100, e.g., as a result of another service or application. Some examples of applications and services 208 are described in U.S. patent application Ser. No. 15/274,519, filed Sep. 23, 2016 and entitled "Data Analytics Services for Distributed Industrial Performance Monitoring," in U.S. patent application Ser. No. 15/274,233, filed Sep. 23, 2016 and entitled "Distributed Industrial Performance Monitoring and Analytics," and in U.S. patent application Ser. No. 15/332,521, filed Oct. 24, 2016 and entitled "Process Device Condition and Performance Monitoring", the entire disclosures of which are hereby incorporated by reference.

The one or more remote systems 210 may be implemented in any desired manner, such as by a remote bank of networked servers, one or more cloud computing systems, one or more networks, etc. For ease of discussion, the one or more remote systems 210 are referred to herein using the singular tense, i.e., "remote system 210," although it is understood that said term may refer to one system, more than one system, or any number of systems.

Generally speaking, the security architecture 200 provides end-to-end security from the field environment of the process plants 100 in which devices 202 are installed and operate, to the remote system 210 providing applications and/or services 208 that consume and operate on the data generated by the process plant 100. As such, data that is generated by the devices 202 and other components of the process plant 100 is able to be securely transported to the remote system 210 for use by the remote applications/services 208 while protecting the plant 100 from cyber attacks, intrusions, and/or other malicious events. In particular, the security architecture 200 includes a field gateway 212, a data diode 215, and an edge gateway 218 disposed between the process plant 100 (e.g., between the wireless gateways 205A, 205B of the process plant 100) and the remote system 210. Typically, but not necessarily, the field gateway 212, the data diode 215, and the edge gateway 218 are included at Security Levels 2-5.

A key aspect of the security architecture 200 is the data diode 215. The data diode 215 is a component that is implemented in hardware, firmware and/or software and is particularly configured to prevent two-way communications between the process plant 100 and the remote system 210. That is, the data diode 215 allows data traffic to egress from the process control system 100 to the remote system 210, and prevents data traffic (e.g., that is transmitted or sent from the remote system 210 or other systems) from ingressing into the process control system 100.

Accordingly, the data diode 215 includes at least one input port 220 that is communicatively connected to the field gateway 212 and at least one output port 222 that is communicatively connected to the edge gateway 218. The data diode 215 also includes a fiber optic or communication link of any other suitable technology that connects its input port 222 to its output port 222. To prevent data traffic from flowing to (e.g., ingressing into) the process control system 100, in an example implementation, the data diode 215 excludes or omits an input port to receive data from the edge gateway 218 (or other component at a higher security level), and/or excludes or omits an output port to transmit data to the field gateway 212 (or other component at a lower security level). In an additional or alternative implementation, the data diode 215 excludes, omits, and/or disables transceivers that otherwise would allow data to flow from the output port 222 to the input port 220, and/or excludes a physical communication path for data to flow from the output port 222 to the input port 220. Still additionally or alternatively, the data diode 215 may support only unidirectional data flow from the input port 220 to the output port 222 via software, e.g., by dropping or blocking any messages received at the output port 222 from the edge gateway 218 (or higher security level component), and/or by dropping or blocking any messages addressed to the field gateway 212 (or lower security level component).

Data that is egressed from the process plant 100 and transmitted across the data diode 215 from the input port 220 to the output port 222 may be further secured across the data diode 215 by encryption. In an example, the field gateway 212 encrypts data and delivers encrypted data to the input port 220. In another example, the data diode 215 receives data traffic from the field gateway 212, and the data diode 215 encrypts the received data traffic prior to transiting the data to the output port 222. The data traffic that is encrypted and transported across the data diode 215 may be UDP (User Datagram Protocol) data traffic, in an example, and may be JSON data traffic or some other general purpose communication format, in another example.

The field gateway 212 communicatively connects the lower security side of the data diode 215 to the process control plant 100. As shown in FIG. 3, the field gateway 212 is communicatively connected to the wireless gateways 205A, 205B that are disposed within the field environment of the process plant 100, and that are communicatively connected to one or more devices or data sources 202. As previously discussed, the devices or data sources 202 and the wireless gateways 205A, 205B may communicate using the WirelessHART industrial protocol or other suitable wireless protocol that is structured to provide secured communications via one or more security mechanisms. For instance, the WirelessHART industrial protocol provides 128-bit AES encryption, and the communication paths 204A, 204B may be secured accordingly.

Additionally, the communicative connection 225 between the wireless gateways 205A, 205B and the field gateway 212 is respectively secured using the same or a different security mechanism as utilized for the communicative connections 204A, 204B. In an example, the communicative connection 225 is secured by a TLS (Transport Layer Security) wrapper. For instance, the wireless gateways 205A, 205B generate packets in the HART-IP format which are secured by a TLS wrapper for transit to the field gateway 212.

Thus, as described above, in an embodiment, data or packets generated by the devices 202 may be secured for transit 204A, 204B to the wireless gateways 205A, 205B using a first security mechanism, and subsequently secured for transit 225 from the wireless gateways 205A, 205B to the field gateway 212 using a second security mechanism, and still subsequently secured for transit across the data diode 215 using a third security mechanism.

Now turning to the higher security side of the data diode 215, data traffic egressing from the data diode 215 may be secured for transit to the edge gateway 218, if desired, by using a fourth security mechanism, or by using one of the security mechanisms employed on the lower security side of the data diode 215 discussed above. Additionally or alternatively, and as depicted in FIG. 3, the edge gateway 218 may be protected by a firewall 228, which may be the firewall 12C of FIG. 1 or another firewall.

Data transiting from the edge gateway 218 to the remote system 210 may be delivered using one or more public and/or private networks, such as a private enterprise network, the Internet, a cellular router, a backhaul Internet or other type backhaul connection. Significantly, the data transiting from the edge gateway 218 to the remote system 210 is secured by using a fifth security mechanism or by using one of security mechanisms previously discussed above. FIG. 3 depicts the data traffic delivered from the edge gateway 218 to the remote system 210 as being secured via an SAS (Shared Access Signature) Token, which may be managed through a token service 230 provided at the remote system 210. The edge gateway 218 authenticates to the token service 230 and requests an SAS token, which may be valid for only a finite period of time, e.g., two minutes, five minutes, thirty minutes, no more than an hour, etc. The edge gateway 218 receives and uses the SAS token to secure and authenticate an AMQP (Advanced Message Queuing Protocol) connection to the remote system 210 via which content data is transmitted from the edge gateway 218 to the remote system 210. Of course, using SAS tokens and the AMQP protocol to secure data transiting between the edge gateway 218 and the remote system 210 is only one of many possible security mechanisms. For example, any one or more suitable Internet-Of-Things (IOT) security mechanisms may be utilized to secure data transiting between the edge gateway 218 and the remote system 210, e.g., X.509 certificates, other types of tokens, other IOT protocols such as MQTT (MQ Telemetry Transport) or XMPP (Extensible Messaging and Presence Protocol), and the like. In these other embodiments, the service 230 provides and/or issues the appropriate security tokens or certificates, for example.

At the remote system 210, user authentication and/or authorization is provided by any one or more suitable authentication and/or authorization security mechanisms 232. For example, secure access to the remote system 210 may be provided by a domain authentication service, an API user authentication service, and/or any other suitable authentication and/or authorization service 232. As such, only users 235 that are authenticated and/or authorized via the authentication and/or authorization service 232 are able gain access to at least some of the data that is available at the remote system 210, which includes, inter alia, the data generated by the devices 202.

Thus, as described above, the security architecture 200 provides end-to-end security for data generated by devices or data sources 202 while operating in the process plant 100 to control a process, e.g., from the data's inception by the data sources 202 through its transmission to the remote system 210 to be operated on by one or more remote applications or services 208. Importantly, the security architecture 200 provides this end-to-end security while preventing malicious attacks from being incurred on the process plant 100.

It is noted that although FIG. 3 depicts wireless gateways 205A, 205B as communicatively connecting the devices or data sources 202 to the field gateway 212, in some arrangements one or more of the wireless gateways 205A, 205B are omitted and source data is transmitted from the data sources 202 directly to the field gateway 212. For example, the data sources 202 may transmit source data directly to the field gateway 212 via a big data network of the process plant 100. Generally speaking, a big data network of the process plant 100 is not the backbone plant network 110, nor is the big data network an industrial protocol network used to transmit control signals between devices using an industrial communication protocol (e.g., Profibus, DeviceNet, Foundation Fieldbus, ControlNet, Modbus, HART, etc.). Rather, a big data network of the process plant 100 may be an overlay network implemented for the process plant 100 that streams data between nodes for data processing and analytics purposes, for example. The nodes of a big data network may include, for example, the data sources 202, the wireless gateways 205A, 205B, and the field gateway 212, as well as any one or more of the components 111, 115-122, 126, 128, 135, 140-146, 152, 155, 158, 160, 170, 171-176, 178 shown in FIG. 2 and other components. Accordingly, for many nodes of a process plant data network include, respectively, a designated interface for process plant operations that typically utilizes an industrial communication protocol, and another designated interface for data processing/analytics operations that may utilize a streaming protocol, for instance. An example of a big data network which may be utilized in a process plant 100 is described in U.S. patent application Ser. No. 14/507,188 entitled "Regional Big Data in Process Control Systems" and filed on Oct. 6, 2014, the entire disclosure of which is incorporated by reference herein.

It is further noted with respect to FIG. 3 that in some embodiments, a wired gateway (not shown) may be utilized in lieu of one of the wireless gateways 205A, 205B. Still further, the field gateway 212, the data diode 215, and the edge gateway 218 may be physically co-located, such as indicated by the box 235 shown in FIG. 3, or one or more of the components 212, 215, 218 may be physically located across multiple locations. For example, one or more of the field gateway 212, the data diode 215, or the edge gateway 218 may be disposed at the process plant 100. Additionally or alternatively, one or more of the field gateway 212, the data diode 215, or the edge gateway 218 may be disposed remotely from the process plant 100.

The process plant 100 may be serviced by more than one field gateway 212, if desired, and any number of field gateways 210 may be serviced by a single edge gateway 218. In some embodiment, the remote system 210 is serviced by more than one edge gateway 218, if desired.

As previously discussed, data traffic that is transported across the data diode 215 is secured. Such data traffic may be communicated across the data diode 215, for example, by using serial communication or UDP communication. However, securing such communications without two-way communications is difficult and cumbersome, as typically both UDP and serial communications require both sides not only to communicate bi-directionally (which is not possible using the data diode 215), but also to remember and enter long key sequences. Thus, rather than using traditional, two-way communications to secure data transport across the unidirectional data diode 215, the transported data may be secured via a security provisioning process utilized between the edge gateway 218 and the field gateway 212. The security provisioning process establishes unique initial key or secret material that is shared between the edge gateway 218 and the field gateway 212 (e.g., a symmetric key or symmetric material), such as a join key. Using the join key, the edge gateway 218 and the field gateway 212 establish a secure connection that is used to exchange further key or secret material which, in turn, is utilized to securely transport data traffic across the data diode 215.

Figure 4:
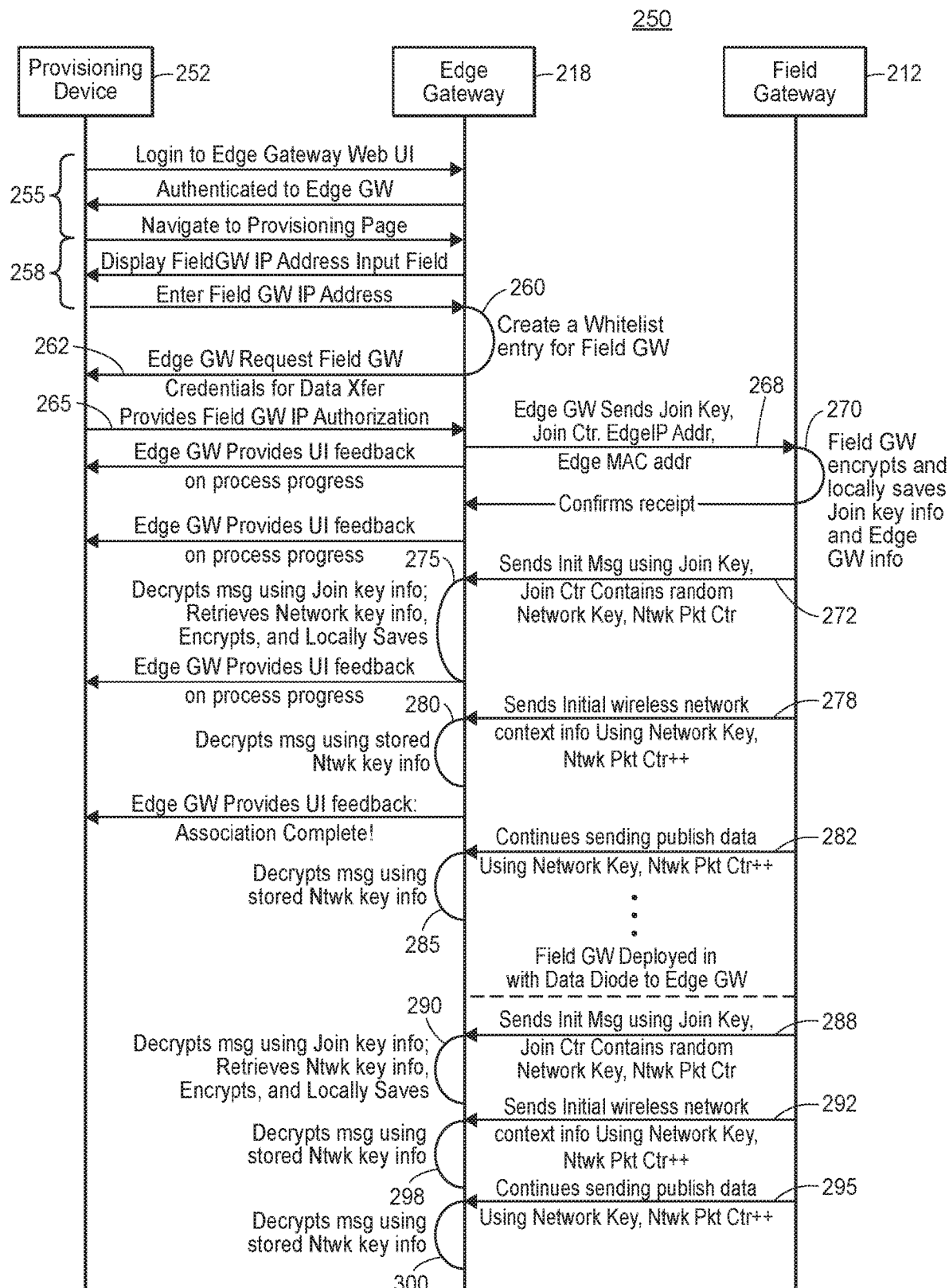
FIG. 4 depicts an example message flow that may be used for provisioning secured communications for a process plant or process control system.

FIG. 4 depicts an example message flow 250 that may be used for the security provisioning process. In FIG. 4, the field gateway 212 and the edge gateway 218 are both included on a provisioning network (e.g., the same subnet, not shown), as is a provisioning server or computing device 252 that is operated by a user to provision the field gateway 212 to the edge gateway 218. Via the provisioning network, in an embodiment, the field gateway 212 and the edge gateway 218 are able to temporarily communicate bi-directionally with each other to set up provisioning, e.g., using TCP type communication.

For example, at reference 255, the user logs in, via the provisioning device 252, to the user interface (UI) of the edge gateway 218, and is authenticated thereto. For example, the UI of the edge gateway 218 may be a web interface, or some other suitable UI. Via the provisioning page or display view of the edge gateway 218, the user enters the address of the field gateway 212 (reference 258) (which may be an IP address, in an example), thereby causing the edge gateway 218 to create a white list entry for the field gateway 212 (reference 260). Subsequently, the edge gateway 218 requests the provisioning device 252 for the credentials of the field gateway 212 that are to be used in data transfer (reference 262).

In response to the edge gateway's request, the user provides, via the provisioning device 252, authorization and security information for the field gateway 212 (reference 265). Said authorization and security information typically (but not necessarily) includes initial key material that is to be shared with the field gateway 212. In an example, the initial key material includes a 128-bit, 192-bit, or 256-bit join key, and includes a 32-bit or 64-bit packet counter, which may be used as part of a nonce for packet encryption/decryption and, in some cases, for MIC (Message Integrity Check) calculations performed on packets. For example, a value of the packet counter is incremented, changed, or updated in the nonce of each transmission to help defend against network replay attacks. At any rate, the edge gateway 218 encrypts and stores a local copy of the initial key material, and sends the initial key material as well as one or more addresses of the edge gateway 218 (e.g., the IP address and/or the MAC address of the edge gateway 218) to the field gateway 212 (reference 268). At the field gateway 212, the field gateway 212 encrypts and stores a local copy of the initial key material as well as the addresses of the edge gateway 218, and confirms receipt to the edge gateway 218 (reference 270).

Subsequently, the field gateway 212 initiates unidirectional communications with the edge gateway 218 across the data diode 215, e.g., by using UDP. In particular, the field gateway 212 transmits an initial message to the edge gateway 218 that includes a new randomly-generated network key and randomly generated packet counter (e.g., that is to be used in the nonce and for MIC calculations) that are to be used for encrypting and integrity-checking subsequent messages. The new network key and respective packet counter are encrypted using the initial key material, e.g., the join key and its respective packet counter (reference 272). The edge gateway 218 decrypts the received initial message using its locally stored initial key material, stores the new network key and packet counter (reference 275), and uses the stored network key in packet counter to decrypt messages or packets that are subsequently received from the field gateway 212.

Note that, as illustrated in FIG. 4, upon the edge gateway 218 receiving the first message from the field gateway 212 that has been encrypted using the new network key and includes the new packet counter (references 278, 280), the secured provisioning process may be considered to be complete, and the provisioning device 252 may no longer be involved in the message flow 250. As a result, in an embodiment, a temporary communications channel that was utilized for communicating from the edge gateway 218 to the field gateway 212 (e.g., that was utilized at reference 268) is torn down, disabled, or otherwise made unavailable. However, the field gateway 212 continues to send data across the unidirectional data diode 215 to the edge gateway 218 using the stored network key and packet counter (reference 282, and the edge gateway 218 continues to decrypt received messages using its stored network key and packet counter (reference 285).

In some embodiments, though, the field gateway 212 and the edge gateway 218 revert to unidirectional communications across the data diode 215 upon disconnection of the provisioning device 252 from the network, or earlier during the message flow 250. For example, the edge gateway 218 may revert to unidirectional communications upon transmitting the initial, join key material to the field gateway 212 (reference 268), and the field gateway 212 may revert to unidirectional communications upon transmitting the confirmation of receipt of the initial key material (reference 270).

For robustness and reliability of data transmission across the unidirectional data diode 215, the field gateway 212 generates another initialization message and respective random packet counter to establish a new or updated network key material with the edge gateway 218. For example, the field gateway 212 transmits another initialization message that is encrypted using the initial join key material and that includes a new or updated network key, and a corresponding new or updated packet counter (reference 288). The initial join key material was previously stored at the field gateway 212 and at the edge gateway 218 (see e.g., references 265, 268, 270), and the updated network key and random packet counter are randomly generated at the field gateway 212, for instance.

At reference 290, the edge gateway 218 verifies the received initialization message, e.g., by checking the white list and/or the addresses from which the new initialization message was received. If the edge gateway 218 determines that the received new initialization message is valid, the edge gateway 218 decrypts the initialization message using its locally stored initial join key material, and saves the new/updated network key and random packet counter included therein for utilization in processing future messages that are received from the field gateway 212. For example, the field gateway 212 may send subsequent messages (references 292, 295) that are encrypted using the new/updated network key and random packet counter, and the edge gateway 218 decrypts the received messages using the stored new/updated network key and random packet counter (references 298, 300).

The field gateway 212 repeats sending a new or updated initialization message (e.g., references 275, 288, and so on) to establish a updated or new network key and respective random packet counter recurrently, periodically, or when desired, e.g., as a result of a user command or occurrence of another event. As communications between the field gateway 212 and the edge gateway 218 are unidirectional across the data diode 215, the field gateway 212 does not have explicit confirmation that the edge gateway 218 is indeed receiving the data transmitted by the field gateway 212. Thus, by the field gateway 212 recurrently sending a new/updated initialization message that includes a new/updated network key and respective random packet counter, the network key material shared between the field gateway 212 and the edge gateway 218 is able to be resynchronized. This resynchronization technique allows for recovery during error or failure conditions, such as when the edge gateway fails and is replaced or restarted, and/or when a packet is missed. The length of the time period for network key material resynchronization may be application dependent, e.g., may be governed by a tolerance of an application (e.g., of one of the applications or services 208) for lost packets or data, and may be configurable.

Accordingly, as described above, the initially provisioned join key and random packet counter or nonce material that are stored at the edge gateway 218 (reference 268) and at the field gateway 212 (reference 270) are utilized to encrypt/decrypt the initial initialization message that provides the initial random network key and random packet start counter (reference 275), and subsequent communications utilize the random network key and packet counter included in the initialization message to encrypt/decrypt the data transmitted therein. Recurrently, periodically, and/or as desired, the field gateway 212 generates a new or updated initialization message that is encrypted/decrypted using the initial join key material, and that provides a new/updated random network key and random packet start counter (reference 288). Communications that are sent after the new/updated initialization message are subject to the new/updated random network key and packet counter to encrypt/decrypt the data transmitted therein. Thus, the edge gateway 218 may simultaneously store previously used network key information and new network key information for a finite amount of time to be able to process packets that may arrive out of order when transitioning to the new network key information.

As illustrated in FIG. 4, the message flow 250 utilizes a provisioning network and provisioning device 252 to perform the secure provisioning process between the field gateway 212 and the edge gateway 218. However, this is only one of many possible embodiments.

For example, in another embodiment, the field gateway 212 and the edge gateway 218 are not on a provisioning network, and may not even be on the same network. In this embodiment, to securely provision the field gateway 212 and the edge gateway 218, a user authenticates directly to the edge gateway 218 and provides security information or data descriptive of the field gateway 212. For example, the user provides the IP address of the field gateway 212 for its white list entry at the edge gateway 218, and the user provides the security information or initial key material, e.g., in a manner similar to that discussed above with the reference 265 in FIG. 4. The security information is encrypted and stored at the edge gateway 218 for use in communications with the field gateway 212. Additionally, the encrypted security information is saved to a separate file, which may also be respectively encrypted. The separate file is transported to the field gateway 212, e.g., by the user. The user authenticates directly to the field gateway 212 and provides the separate file for use at the field gateway 212. The field gateway 212 verifies the separate file (and decrypts the file, if necessary), obtains the security information stored therein (e.g., the initial key material), encrypts the obtained security information, and locally stores the encrypted security information for use in future communications with the edge gateway 218 across the data diode 215.

In another embodiment, instead of UDP, data is transported across the data diode 215 using serial communications. In this embodiment, the secured provisioning process may be similar to that described above for provisioning the field gateway 212 and the edge gateway 218 while the gateways 212, 218 are not on a provisioning network or are on separate networks.

In some implementations, beneath the secured TCP, UDP, and/or serial communications across the data diode 215, the communication protocol utilized for transmitting process plant-generated data across the data diode 215 may be a modified HART-IP protocol, or may be a modification to any known industrial communication protocol, such as Fieldbus, for example.

To use the HART-IP protocol as an illustrative but non-limiting example, the HART-IP protocol may be leveraged to further provide additional security for end-to-end communications from the devices 102 operating in the process plant 100 to the remote system 210. In particular, the publishing mechanism included in HART-IP and HART is leveraged in a unique manner to support the unidirectional communications across the data diode 215 so that data generated at the process plant 100 may be delivered to the remote applications 208 via messages or packets that are transmitted between the field gateway 212 and the edge gateway 218 across the data diode 215 (e.g., as indicated by references 278, 282, 292, 295 in FIG. 4).

The modified HART-IP protocol packets may be of a Token-Passing Data-Link Layer Frame Format, and/or may be of a Direct/Wireless Packet Format. For example, the HART-IP header may be modified to include security information such as an indication of a security type (e.g., as a value in the Message Type field of the header), the Hart-IP session initialization message may be modified to include the initial security key material information, and/or other HART message types (e.g., Request, Response, etc.) may be modified to include a network security key field and a network security counter field.

Figure 5:
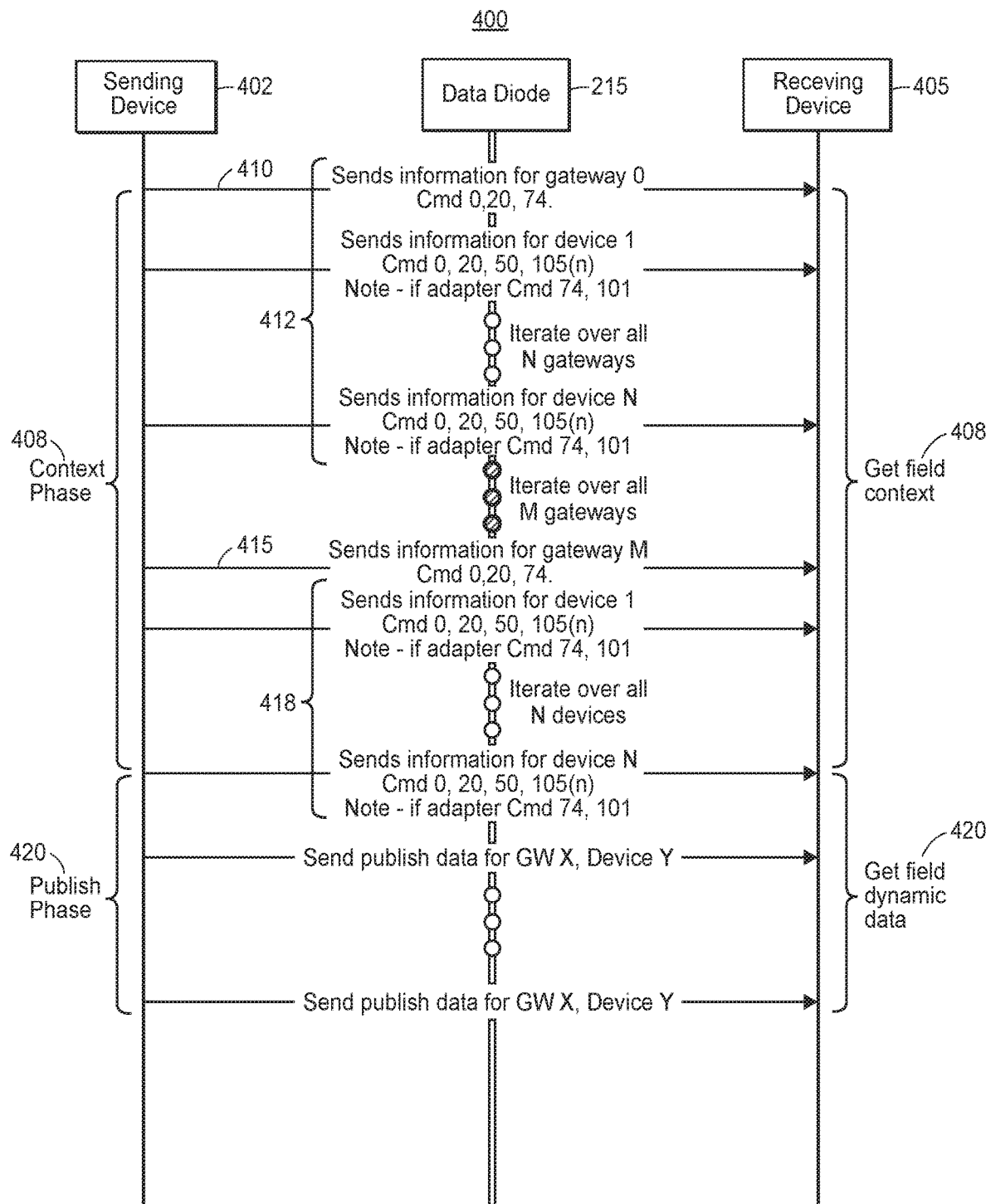
FIG. 5 depicts an example message flow that may be used to deliver process plant data across the data diode.

An example usage of the modified HART-IP protocol for securing communications across the data diode 215 is shown in FIG. 5. FIG. 5 depicts an example message flow 400 that may be used to deliver process plant data that is generated by one or more sending devices 402 across the data diode 215 to one or more receiving devices 405. Generally speaking, a sending device 402 first provides discovery information to a receiving device 405 to set the context for content or payload data that is to be transmitted across the data diode 215. The discovery information allows the receiving device 405 to know what data-generating components or devices are on the process plant-side of the data diode 215, the types and/or identities of the data that will be generated by the process plant-side components, the rates at which the generated data is/are expected to arrive at the receiving device 405, statuses of the various data-generating components or devices, etc. Importantly, the discovery information allows the receiving device 405 to obtain this knowledge without the receiving device 405 needing to interrogate or query components devices on the process plant-side of the data diode 215, which the receiving device 405 is not able to do due to the unidirectional nature of the data diode 215.

After the discovery information has been provided by the sending device 402 to the receiving device 405, the sending device 402 publishes, using the modified HART-IP protocol, content or payload data across the data diode 215 in accordance with the context provided in the discover information in real-time, e.g., as the sending device 402 generates the source data, and/or as the sending device 402 receives source data from one or more other components within the process plant 100. As such, the receiving device 405 may be a subscriber to data that is published by the sending device 402.

Additionally, also due to the unidirectional nature of the data diode 215, the sending device 402 is not able to discern the status of the receiving device 405 (e.g., whether or not the receiving device 405 is operational, power cycled, disconnected, etc.) and is not able to determine explicitly whether or not the receiving device 405 has received the data that was sent. Accordingly, the sending device 402 recurrently (e.g., periodically, and/or as desired) provides, sends, or announces discovery information to the receiving device 405 so that if the receiving device 405 happened to be unavailable, upon restoration the receiving device 405 is able to quickly (re-)understand the context of the content or payload data being sent by the sending device 402. The length of the time period between sending discovery information may be dependent on the tolerance of a client application (e.g. one of the remote applications or services 208) on the receiving device-side of the data diode 215 for lost packets or data, and may be configurable. Discovery information may also be sent when a change on the sending device 402 side occurs, such as when data sources 202 and/or wireless gateways 205 are added to or removed from the process plant 100.

The sending device 402 may be a field gateway 212, a wireless gateway 205, a data source device 202, and/or any other component that provides data generated by one or more components or devices operating within the process plant 100. The receiving device 405 may be an edge gateway 218, one or more of the devices comprising the remote system 210, and/or a client application that is a consumer of source data (e.g., one of the remote applications or services 208). In FIG. 5, though, for ease of discussion, the message flow 400 is discussed as if the sending device 402 is the field gateway 212 of FIG. 3, and the receiving device 405 is the edge gateway 218 of FIG. 3, although it is understood that this is only one of numerous possible embodiments.

During the context-setting phase 408, the sending device 402 transmits respective information that is descriptive of each data source of the process plant 100 whose data is to be transmitted across the data diode 215. The descriptive data source information includes, for example, an identity of the data source (e.g., unique identifier, device tag, etc.); an identity of the data (which may include, for example, mapping information to one or more of its dynamic variables such as Primary Variable (PV), Secondary Variable (SV), Tertiary Variable (TV), Quaternary Variable (QV), etc.); an indication of the rate at which the identified data is expected to arrive (e.g., burst configuration information); and/or other information that is descriptive of the data and/or the data source, such as data indicative of the particular gateway to which the data source is communicatively connected, status of the data source, status of its gateway, etc. As illustrated in FIG. 5, in an embodiment, the sending device 402 iterates on a per wireless gateway 205, per data source device 202 basis during the context-setting phase 408. For example, the sending device 402 sends descriptive information for wireless gateway 0 (reference 410) which may be, for example, one of the wireless gateways 205A, 205B. The sending device 402 may send descriptive information of the wireless gateway 0 by using a modified HART-IP command 0, 20, or 74, for instance. Subsequently, the sending device 402 sends respective descriptive information for each of the N devices that is communicatively connected to gateway 0 (reference 412), for instance, by using the modified HART-IP command(s) 0, 20, 50, 105(n), and optionally commands 74 and 101 for sub-device burst mapping. This sequence is repeated for each of the M gateways, and the context-setting phase 408 ends after the descriptive information for gateway M and its respective N devices has been sent to the receiving device 405 (references 415, 418).

During the publishing phase 420, the sending device 402 publishes source data across the data diode 215 for any of the data source devices 202 whose context was set during the context-setting phase 408. In an example, the sending device 402 publishes the source data across the data diode 215 by using a modified HART-IP command 48, or other suitable Hart-IP command. Particular source data is published at the rate at which the source data is received at the sending device 402, e.g., from the device 202 via its respective wireless gateway 205. That is, during on-line operations of the process plant 100, source data generated by the process plant 100 is published across the data diode 215 in real-time as it is received by the sending device 402. It is noted that some data-generating components of the process plant 100 (e.g., some of the data source devices 202 and/or some of the wireless gateways 205) may publish data directly to the field gateway 212 for delivery across the data diode 215. Other data-generating components of the process plant 100 (e.g., others of the data source devices 202 and/or wireless gateways 205) may not support publishing, and the field gateway 212 may poll these types of devices/gateways in order to receive their respective source data. For example, the field gateway 212 may poll based on a burst configuration of the device/gateway that does not support publishing, e.g., by using HART-IP commands 3 or 9.

As previously discussed, after a pre-defined period of time elapses, or as desired, at least some of the context information 410-418 is resent or updated by the sending device 402 to the receiving device 405. In an embodiment, the entirety of the context data 410-418 of gateways 0-M and respective devices 1-N is resent or updated. In another embodiment, particular context data for particular devices is resent or updated at various different times as is required for a particular consumer of the data, e.g., based on a tolerance of the particular consumer for lost data or packets. In these embodiments, different devices may have different periodicities or intervals at which their respective context data is resent or updated.

Additionally, it is noted that the above message flow 400 is described in an embodiment in which the data diode 215 is an Ethernet connected data diode. However, similar techniques may be easily up applied to a serially connected data diode, if desired. Further, although the above message flow 400 was described using the HART-IP protocol, other communication protocols may be utilized in during the context phase 408 and data delivery phase 420 of the message flow 400. In some example configurations, industrial communication protocols other than HART-IP (e.g., Profibus, DeviceNet, Foundation Fieldbus, ControlNet, Modbus, HART, etc.) may be utilized. In other example configurations, other protocols that are not specifically designed for industrial communications may be utilized during the context phase 408 and the data delivery phase 420 of the message flow 400.

For example, in an embodiment, instead of using HART-IP, packets may be transmitted across the data diode 215 using a JSON (JavaScript Object Notation) format. In this embodiment, the field gateway 212 converts data that is received from various devices and components within the process plant 100 into a JSON format for delivery across the data diode 215. If desired, enhancements to the JSON packet data may be added, such as providing labels that have additional meaning (e.g., "PRESSURE" instead of "PV", device-specific labels for various data values, and like).

Further, although the discussion of FIG. 5 above describes the message flow 400 occurring as if the sending gateway 402 is the field gateway 212 and the receiving device 405 is edge gateway 218, this is only one of many embodiments. For example, in other embodiments of the message flow 400, the sending device 402 may be a field gateway 212, a wireless gateway 205, a data source device 202, and/or any other component that provides data generated by one or more components or devices operating within the process plant 100, and the receiving device 405 may be an edge gateway 218, one or more of the devices comprising the remote system 210, and/or a client application that is a consumer of source data (e.g., one of the remote applications or services 208). For example, a first one of the client applications 208 may subscribe to data generated by a particular device 202 that is published across the data diode 215, and a second one of the client applications 28 may subscribe to data generated by another particular device 202. In this example, the edge gateway 218 may serve as a router to distribute received data to respective data subscribers. In another example, the edge gateway 218 publishes all data that it receives via the data diode 215, and various applications 208 subscribe to specific data published by the edge gateway 218. Other publisher/subscriber relationships are possible, and may be supported by any one or more of the secured communication techniques described herein.

Still further, any one or more of the secured communication techniques may be easily applied to securing data that is sent to systems and/or devices that are local to the process plant 100. For example, a respective data diode 215 and/or instance of the security architecture 200 may be utilized to publish selected (or even all) data across the DMZ 22 of the process plant 100, so that the data generated at security Levels 0-3 of the process plant 100 is securely delivered across the DMZ 22 to enterprise systems at Levels 4-5 via a respective data diode. In another example, a respective data diode 215 and or instance of the security architecture 200 may be utilized to publish selected (or even all) data from one or more data sources 202 disposed in the process plant 100 to one or more local servers that are also disposed in or locally to the process plant 100 and that host or provide local services and applications. Such a configuration is beneficial, for example, when local services and applications generate local prescriptive changes that are to be downloaded or otherwise implemented into the on-line process plant 100, although generally, prescriptive functions, modifications to configurations and/or other data, and/or other changes may be implemented into the process plant 100 by remotely located applications and services 208.

It is noted, though, that any prescriptive changes that are determined by the applications/services 208 are typically implemented into the process plant 100 via some other communication mechanism other than the data diode 215, as the data diode 215 is unidirectional in the egress direction with respect to the process plant 100. For example, to implement a prescriptive change to the process plant 100, a remote application/service 208 may establish a secured communication connection other than via the data diode 215 with one or more administrative or back-end components of the process plant 100, such as the operator workstation 171, the configuration applications 172A, the configuration database 173B, etc., and the prescriptive change may be downloaded or otherwise delivered to the process plant 100. In fact, in an embodiment, another instance of the data diode 215 and/or the security architecture 200 may be established in the ingress direction to securely deliver any prescriptive changes from the remote application/service 208 to the process plant 100.

Further, generally speaking, any ingress communications from the remote system 210 to the process plant 210 typically utilizes a communication mechanism other than the egress data diode 215 and/or the egress security architecture 200. For example, the remote system 210 may utilize another instance of data diode 215 and/or the security architecture 200 applied in an ingress direction, or some other suitable secured connection or communication path.

Figure 6:
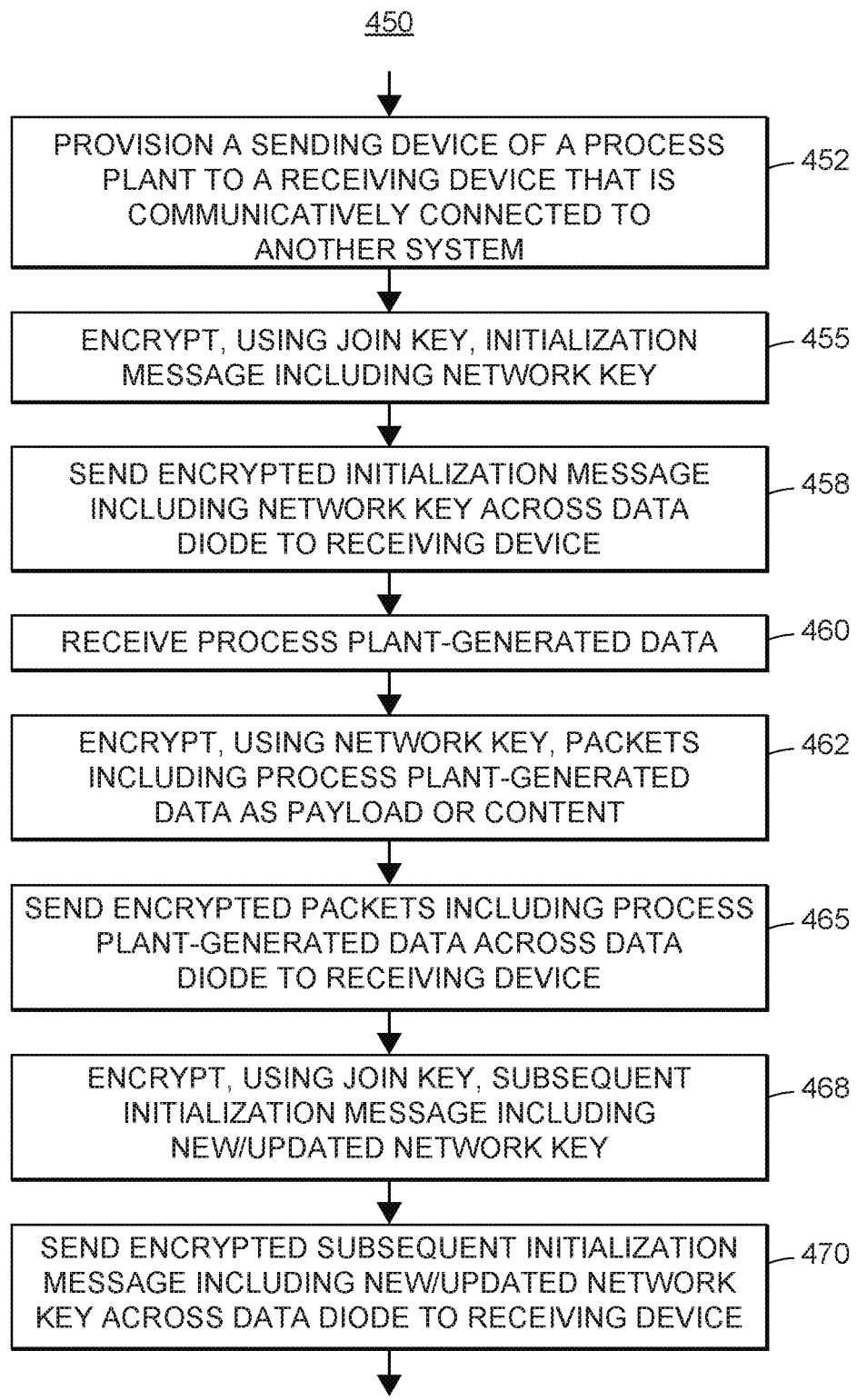
FIG. 6 is a flow diagram of an example method for securely transporting communications from a process plant or process control system.

Returning now to secured egress communications from the process plant 100, FIG. 6 depicts a flow diagram of an example method 450 for securely transporting communications from a process plant, such as the process plant 100 of FIG. 2. In some embodiments, at least a portion of the method 450 is implemented by executing a set of computer-executable or computer-readable instructions stored on one or more non-transitory computer-readable memories and executed by one or more processors, e.g., of the system 200, for example. For example, at least a part of the method 450 may be performed by one or more components of the system 200 depicted in FIGS. 1-5, such as the field gateway 212 or the sending device 402. Accordingly, the method 450 is described below with simultaneous reference to FIGS. 1-5; however, this is for ease of explanation only, and not for limitation purposes.

At a block 452, the method 450 includes provisioning a sending device of a process plant with a receiving device. The sending device is communicatively connected to the process plant (e.g., via one or more suitable networks), and the receiving device is communicatively connected to another system (e.g., via one or more suitable networks), for example. The other system hosts one or more applications or services that are configured to operate on data generated by the process plant during its run-time operations, and optionally on other data generated by the process plant. The sending device may be, for example, the sending device 402 and the receiving device may be, for example, the receiving device 405 illustrated in FIG. 5. As such, the sending device 402 may be the field gateway 212, a data source device 202, a wireless gateway 205, or another component of the process plant 100, and the receiving device may be the edge gateway 218, a computing device included in the remote system 210, or an application or service 208 executing at the remote system 210. Of course, other embodiments of the sending device and/or of the receiving device are possible, e.g., such as any of those previously discussed above.

The sending device and the receiving device are interconnected via a data diode, such as the data diode 215 of FIG. 3. The data diode is configured to allow unidirectional communications to be transmitted from the sending device to the receiving device, and to prevent any communications from being transmitted from the receiving device to the sending device (aside from initial provisioning messages, in an embodiment).

Provisioning the sending device to the receiving device (block 452) is performed using a first key, also referred to as a join key. The join key may be a secret key or a shared secret, and may be provided by a user, e.g., via a provisioning device that is communicatively connected to the sending device and/or the receiving device, or via a manual data transfer. In some arrangements, a first packet counter (also referred to as a join packet counter) or other respective nonce material is provided in conjunction with the join key. The join key and/or the join packet counter may be randomly generated, if desired.

In some embodiments, provisioning the sending device the receiving device (block 452) includes establishing a temporary communications channel to allow communications from the receiving device to the sending device to transmit and/or verify the join key. The temporary communications channel may be established via the data diode, or may be established via some other communicative connection such as an external wired or wireless connection, a manual transfer via a portable storage device, or the like. In these embodiments, upon transmission of the join key by the receiving device and/or the receipt of the join key at the sending device, the temporary communications channel may be disestablished, torn down, or otherwise disabled. Generally speaking, the temporary communications channel serves to only share the first or join key between sending and receiving devices. After the initial key material (e.g., the join key and its respective packet counter or other nonce material) has been shared, the initial key material is locally encrypted and stored respectively at both the sending device and the receiving device.

The method 450 includes encrypting, e.g., by the sending device, an initialization message using the first or join key (block 455), and providing the encrypted initialization message across the data diode to the receiving device (block 458). The initialization message includes therein a second key, also referred to herein as a network key, that is to be utilized by the sending and receiving devices for processing subsequent messages or packets that are transmitted across the data diode from the sending device to the receiving device. The second key may be another secret key or shared secret, for example. At least some of the subsequent messages or packets that are processed using the second or network key include content or payload comprising data that is generated by the process plant while operating in real-time to control a process, such as generated process data, diagnostic data, and other types of data. In some arrangements, a second packet counter (also referred to as a network packet counter) or other respective nonce material is encrypted and provided in conjunction with the network key to be used in processing the subsequent messages/packets. The network key and/or the network packet counter may be randomly generated, if desired.

Accordingly, the method 450 further includes receiving, at the sending device, data that is generated by the process plant while operating in real-time to control the process (block 460); encrypting, by the sending device and by using the network key and optionally the network packet counter, subsequent messages/packets that include the process plant-generated data as payload (block 462); and providing the encrypted subsequent messages/packets across the data diode to the receiving device (block 465). As such, at the blocks 462, 465, the subsequent messages/packets, at least some of which include data generated by the process plant, are secured for transport across the data diode using the shared secret network key. In some embodiments, the subsequent messages/packets are further secured for transport across the data diode by additional encryption, if desired (not shown).

Receiving the data that is generated by the process plant during real-time or on-line operations to control the process (block 460) may include receiving data directly from a data generating source (e.g., a device or component 202), and/or may include receiving, from a gateway (e.g., a wireless gateway 205), data that was transmitted to the gateway from a data-generating source (e.g., a device or component 202). The process plant-generated data that is received at the sending device may have been encrypted, wrapped, and/or otherwise secured by the data-generating source (e.g., the device or component 202), and/or by the gateway (e.g., the wireless gateway 205), for example, in a manner such as previously described.

The process plant-generated data that is received (block 460) may include published data, as some data-generating source devices may publish their respective generated data, e.g., to the wireless gateway 205 and/or to the sending device 402. Other data-generating source devices may be polled (e.g., by the wireless gateway 205 and/or by the sending device 402) so that their respective generated data may be received at the sending device (block 460). Further, the process plant-generated data, whether published, polled, or otherwise received (block 460), may be in a HART-compatible format, in a JSON compatible format, or other suitable format in accordance with any suitable industrial communication protocol or general purpose communication protocol.

As previously discussed, encrypting messages/packets that include process plant-generated data as payload (block 462) includes encrypting said messages/packets using the network key and optionally the network packet counter, e.g., as nonce material, and the transport of the messages/packets across the data diode is further secured by the unidirectional communications configuration of the data diode.

Additionally, providing or sending the encrypted subsequent messages across the data diode to the receiving device (block 465) may include, for example, recurrently announcing or sending, to the receiving device across the data diode, respective context information that is descriptive of each of one or more data-generating devices of the process plant. The respective context information may include an identifier of the subject data-generating device, a respective rate at which data generated by the subject device is to be transmitted or published, an indication of a current status of the subject data generating device, and/or other information that is descriptive of the subject data-generating device, such as discussed above with respect to FIG. 5.

Recurrently announcing context information may include, in an example, periodically sending context information to the receiving device across the data diode. The duration of the periodicity may differ for different types of content data, for different data generating sources of the process plant, and/or for different consumers of the content data (e.g., a remote application 208). For example, a duration of the periodicity for certain types of content data may be based on a tolerance of a consumer of the data for lost packets and/or delay. Of course, context information may be announced to the receiving device across the data diode when or as desired, such as after the sending device has rebooted, when a new data generating device is added to the process plant, as a user indicates, etc.

Further, announcing context information may include utilizing one or more message types of an industrial communication protocol, in an embodiment. For example, when some type of HART communication protocol is utilized across the data diode, announcing context information may include using HART commands 0, 20, 50, 74, 105, and optionally commands 74 and 101. In another embodiment, announcing context information may be implemented using a general purpose communication protocol, such as JSON or some other suitable general purpose communication protocol. Various message types of various industrial communication protocols may be modified to accommodate the announcements, in an example.

Providing the encrypted subsequent messages across the data diode to the receiving device (block 465) also includes transmitting or transporting content data across the data diode in accordance with the previously sent context information. As previously discussed, the content data includes dynamic data generated by the process plant while operating on-line to control the process, such as process data, diagnostic data, and the like. In an embodiment, providing the encrypted subsequent messages across the data diode includes publishing the content data across the data diode, e.g., in a manner such as described above.

The method 450 further includes encrypting a second (e.g., a subsequent) initialization message using the first or join key (block 468), and providing the encrypted, second initialization message across the data diode to the receiving device (block 470). The second initialization message includes an updated or new network key that is to be utilized by the sending and receiving devices for processing subsequent messages or packets that are transmitted across the data diode from the sending device to the receiving device. The updated or new network key may be another shared key or shared secret that is different than the join key discussed with respect to the block 452, and is different than the network key discussed with respect to the blocks 455, 458. An updated or new network packet counter that is also for use for processing subsequent messages/packets may be generated and transported across the data diode in conjunction with the updated or new network key. The new or updated network key and/or packet counter may be randomly generated, if desired.

Accordingly, at the blocks 468, 470, the network key that is used by the sending device and by the receiving device to process messages/packets is re-synchronized. This re-synchronization is important at least because the data diode is unidirectional, and thus the receiving device is not able to provide any feedback as to its operational status, successful or unsuccessful receipt of messages, etc. to the sending device. However, via the blocks 468, 470, the method 450 is able to address communicative disconnects between the sending device and receiving device by re-synchronizing network key material. Indeed, in some embodiments, the blocks 468, 470 are repeated recurrently, periodically, and/or based on the occurrence of certain events (e.g., a rebooting of the sending device, when a user so indicates, as desired, etc.). The duration of the periodicity may be based on a tolerance of one or more consumers of the content data for lost packets and/or delay, for example.

It is noted that, with respect to the blocks 468, 470, that the receiving device may need to maintain both the first network key/packet counter and the second network key/packet counter for a finite period of time, for example, for processing packets that arrive across the data diode in a different order in which they were sent.

Figure 7:
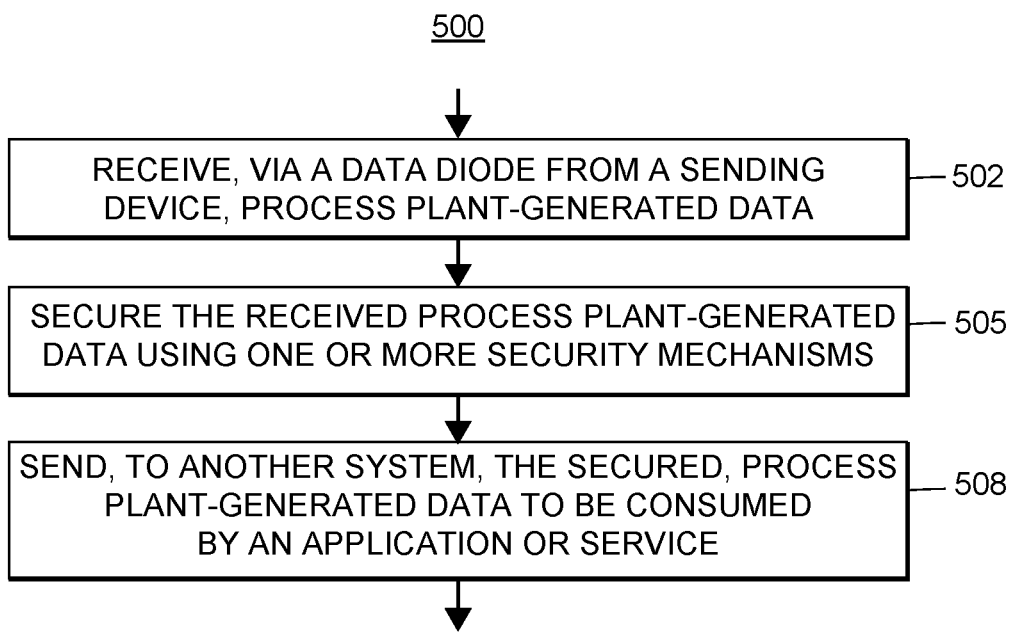
FIG. 7 is a flow diagram of an example method for securely transporting communications from a process plant or process control system.

FIG. 7 depicts a flow diagram of an example method 500 for securely transporting communications from a process plant, such as the process plant 100 of FIG. 2. In some embodiments, at least a portion of the method 500 is implemented by executing a set of computer-executable or computer-readable instructions stored on one or more non-transitory computer-readable memories and executed by one or more processors, e.g., of the system 200, for example. For example, at least a part of the method 500 may be performed by one or more components of the system 200 depicted in FIGS. 1-5, such as the edge gateway 218 or the receiving device 405. Accordingly, the method 500 is described below with simultaneous reference to FIGS. 1-5, however, this is for ease of explanation only and not for limitation purposes.

At a block 502, the method 500 includes receiving, via a data diode, data that is generated by the process plant while operating in real-time to control the process. The data diode is configured to allow unidirectional communications to be transmitted from a sending device to the receiving device, while preventing any communications from being transmitted from the receiving device to the sending device. The process plant-generated data that is received via the data diode (block 502) may include generated process data, diagnostic data, and other types of data, and may be received at a receiving device, such as at the edge gateway 218 or the receiving device 405. The received process plant-generated data may be secured data, e.g., data that was secured by the encryption techniques discussed above, or by some other security mechanism.

At a block 505, the method 500 includes securing the received process plant-generated data using one or more security mechanisms, which may include the same security mechanism that was utilized across the data diode, or may include one or more different security mechanisms. At a block 508, the method 500 includes transmitting the process plant-generated data that was secured at the block 505 to another system that is communicatively connected to the receiving device. For example, the secured, process plant-generated data is transmitted to one or more remote systems 210 at which one or more applications, services, or other consumers of the process plant-generated data 208 reside and execute. The applications, services or other consumers may operate on at least some of the process plant-generated data.

In an embodiment, securing the received process plant-generated data (block 505) and transmitting the secured, process plant-generated data to the other system (block 508) includes establishing a secured connection between the receiving device and the other system. Transmitting the secured, process plant-generated data to the other system (block 508) may include transmitting the data via one or more public and/or private networks, such as the public Internet, a private enterprise network, etc. As such, establishing the secured connection between the receiving device and the other system includes establishing a secured connection through one or more public and/or private networks. Different secured connections may be established for different types of content data, different data generating sources of the process plant, and/or different consumers of the content data, if desired.

In an example, the connection between the receiving device and the other system is secured using a token service. The receiving device authenticates to a token service that is provided by the other system, and in response to the authentication, the receiving device receives a Shared Access Signature (SAS) token from the other system. The receiving device then uses the SAS token while transmitting content data (e.g., process plant-generated data) to the other system. For instance, the receiving device uses the SAS token to secure and authenticate a connection to the other system, e.g., via an AMQP (Advanced Message Queuing Protocol) connection. Additionally, if desired, the content data and SAS token may be encrypted prior to transmission to the other system.

The method 500 may also include re-securing a connection between the receiving device and the other system (block 510). Re-securing a connection between the receiving device and the other system 510 includes, for example, receiving an updated or different SAS token from the other system (e.g., from the token service at the other system) to use for transmitting subsequent content data. A particular SAS token may have a pre-defined expiration period (e.g., five minutes, ten minutes, less than an hour, or other expiration period, which may be configurable). Upon a token's expiration, the receiving device may request or retrieve the new SAS token to use for subsequent messages. Alternatively, the other system may automatically send an updated or new SAS token for the receiving device to use upon the previous token's expiration.

Of course, although securing and re-securing connections between the receiving device and the other system (e.g., blocks 505, 508, and 510) is described above as utilizing SAS tokens and the AMQP protocol, this is only one of many possible embodiments of the method 500. Any one or more suitable TOT security mechanisms may be utilized by the method 500, such as, for example, X.509 certificates, other types of tokens, other TOT protocols such as MQTT or XMPP, etc.

Embodiments of the techniques described in the present disclosure may include any number of the following aspects, either alone or combination:

1. A method for securely transporting communications from a process plant to another system, the method comprising: at a field gateway interconnecting a network of the process plant and a data diode configured to prevent two-way communications between the field gateway and an edge gateway, recurrently announcing, to the edge gateway across the data diode, respective context information descriptive of each of one or more devices of the process control plant; receiving, at the field gateway via the process plant network, data generated by the each of the one or more devices while the process plant operates to control a process; and publishing, by the field gateway to the edge gateway across the data diode, the process plant data.

2. The method of the previous aspect, wherein recurrently announcing the respective context information descriptive of a particular device comprises periodically sending the respective context information descriptive of the particular device, the periodicity based on a tolerance of an application for lost data, the application being a consumer of the data generated by the particular device, and the application communicatively connected to the edge gateway.

3. The method of any one of the previous aspects, wherein receiving, at the field gateway, the data generated by the each of the one or more devices comprises receiving, at the field gateway, at least some of the data generated by the each of the one or more devices via the HART-IP® protocol.

4. The method of any one of the previous aspects, wherein receiving at least some of the data generated by the each of the one or more devices via the HART-IP protocol comprises receiving data that has been published by the each of the one or more devices.

5. The method of any one of the previous aspects, further comprising transmitting, by the field gateway, a poll to a particular device; and wherein receiving, at the field gateway, the data generated by the each of the one or more devices comprises receiving, at the field gateway, data generated by the particular device in response to the poll.

6. The method of any one of the previous aspects, wherein receiving the data generated by the each of the one or more devices comprises receiving data indicative of a diagnostic result.

7. The method of any one of the previous aspects, wherein recurrently announcing the respective context information of the each of the one or more devices comprises recurrently sending the respective context information for the each of the one or more devices using at least one HART protocol command from a group of HART protocol commands including command 0, command 20, command 50, command 74, or command 105.

8. The method of any one of the previous aspects, wherein recurrently announcing the respective context information of the each of the one or more devices comprises recurrently sending an indication of an identifier of the each of the one or more devices and an indication of a respective rate at which data generated by the each of the one or more devices is to be provided.

9. The method of any one of the previous aspects, wherein publishing the process plant data across the data diode comprises publishing the process plant data across the data diode using the HART-IP® protocol.

10. The method of any one of the previous aspects, wherein publishing the process plant data across the data diode comprises publishing the process plant data across the data diode using a JSON format.

11. A system for securely transporting communications from a process plant to another system, the system comprising: a field gateway communicatively coupled to a network of the process plant; an edge gateway communicatively coupled to the another system; and a data diode interconnecting the field gateway and the edge gateway, the data diode configured to prevent communications transmitted by the edge gateway from being ingressed into the field gateway, wherein data generated by one or more devices included in the process plant while the process plant is operating to control an industrial process is received at the field gateway via the process plant network and is published, by the field gateway, across the data diode to the edge gateway.

12. The system of the previous aspect, further configured to perform at least a part of the method of any one of aspects 1-10.

13. The system of any one of aspects 11-12, wherein the data generated by the one or more devices is published across the data diode using the HART-IP® protocol.

14. The system of any one of aspects 11-13, wherein the data generated by the one or more devices is published across the data diode using a JSON format.

15. The system of any one of aspects 11-14, further including a wireless gateway at which the data generated by the one or more devices is received and provided to the field gateway.

16. The system of any one of aspects 11-15, wherein the wireless gateway is a WirelessHART® gateway.

17. The system of any one of aspects 11-16, wherein the wireless gateway provides the data generated by the one or more devices to the field gateway using the HART-IP protocol.

18. The system of any one of aspects 11-17, wherein at least one of the one or more devices publishes respective generated data to the wireless gateway.

19. The system of any one of aspects 11-18, wherein the wireless gateway to which the respective generated data is published is a subscriber of the respective generated data.

20. The system of any one of aspects 11-19, wherein the wireless gateway polls at least one of the one or more devices to obtain respective generated data.

21. The system of any one of aspects 11-20, wherein an application executing at the another system is a consumer of at least some of the data generated by the one or more devices included in the process plant.

22. The system of any one of aspects 11-21, wherein the edge gateway publishes the at least some of the data generated by the one or more devices included in the process plant, and the application executing at the another system is a subscriber of the data published by the edge gateway.

23. The system of any one of aspects 11-22, wherein the data generated by the one or more devices while the process plant is operating to control an industrial process comprises at least one of dynamic data generated by the one or more devices or diagnostic data generated as a result of a diagnosis or test of the one or more devices.

24. The system of any one of aspects 11-23, wherein the data diode is Ethernet-connected.

25. The system of any one of aspects 11-24, wherein the data diode is serial-connected.

26. The system of any one of aspects 11-25, wherein the field gateway further publishes, across the data diode to the edge gateway, respective information descriptive of each of the one or more devices.

27. The system of any one of aspects 11-26, wherein the respective information descriptive of the each of the one or more devices includes an indication of a respective identity of the each of the one or more devices and a respective rate at which data generated by the each of the one or more devices is to be published.

28. The system of any one of aspects 11-27, wherein the respective information descriptive of the each of the one or more devices further includes an indication of a status of the each of the one or more devices.

29. The system of any one of aspects 11-28, wherein the another system is configured to at least one of: monitor conditions and/or events occurring at the process plant; sense the conditions and/or events occurring at the process plant; monitor at least a portion of a process being controlled by the process plant; perform descriptive analytics using the generated data; perform prescriptive analytics using the generated data; or generate, based on the generated data, a prescriptive function to modify at least a portion of the process plant.

30. The system of any one of aspects 11-29, wherein the another system is implemented at least in part at one or more cloud computing systems.

31. Any one of the previous aspects in combination with any other one of the previous aspects.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method for securely transporting communications from a process plant, the method comprising:
at a field gateway interconnecting a process plant network and a data diode configured to prevent two-way communications between the field gateway and an edge gateway:
selecting, by the field gateway, a set of process plant data generated by one or more devices of the process plant while the process plant operates to control an industrial process;
obtaining, by the field gateway via the process plant network, the selected set of process plant data in a first format from the one or more devices;
providing, by the field gateway to the edge gateway across the data diode, information indicative of an identity of the selected process plant data, the information indicative of the identity of the selected process plant data mapped from a configuration that corresponds to the selected process plant data and that is stored in the process plant;
converting, by the field gateway, the obtained, selected set of process data into a second format; and
publishing, by the field gateway to the edge gateway across the data diode, the obtained, selected set of process plant data in the second format to the edge gateway in accordance with the information indicative of the identity of the selected process plant data including using a label different than a label utilized by the configuration corresponding to the selected process plant data.

2. The method of claim 1, wherein the selected set of process plant data is a first set of process plant data, and the method further comprises not transmitting, by the field gateway, a second set of process plant data generated by the one or more devices of the process plant across the data diode to the edge gateway.

3. The method of claim 1, wherein obtaining, by the field gateway, the selected set of process plant data in the first format from the one or more devices comprises receiving, by the field gateway, a data stream including the selected set of process plant data and streamed by the one or more devices to the field gateway via the process plant network.

4. The method of claim 3, wherein the process plant network is a data network other than a process control communication network via which the one or more devices communicate, using an industrial communication protocol, data to control the process within the process plant.

5. The method of claim 3,
further comprising subscribing, by the field gateway, to the selected set of process plant data generated by the one or more devices; and
wherein obtaining, by the field gateway, the selected set of process plant data comprises obtaining, by the field gateway, a publication of the selected set of process plant data.

6. The method of claim 1, wherein obtaining, by the field gateway, the selected set of process plant data comprises obtaining, by the field gateway, process plant data generated by and/or corresponding to at least one of: a process parameter, a process variable, a function block, a module, an event, historized data, a piece of equipment, a display view, a device, or one or more other components of the process plant.

7. The method of claim 1, wherein providing the information indicative of the identity of the selected process plant data comprises providing a context of the selected process plant data, the context of the process plant data including the information indicative of the identity of the selected process plant data and information indicative of the one or more devices that generated the selected process plant data.

8. The method of claim 1, wherein converting the obtained, selected set of process data into a second format comprises converting the obtained, selected set of process data into an IP format or another type of packet format.

9. The method of claim 1, wherein publishing the obtained, selected process plant data across the data diode comprises publishing the obtained, selected process plant data across a fiber optic link.

10. The method of claim 1, wherein publishing the obtained, selected process plant data across the data diode comprises publishing the obtained, selected process plant data across the data diode via a session established between the field gateway and the edge gateway.

11. The method of claim 1, wherein publishing the obtained, selected process plant data across the data diode comprises publishing at least one of: run-time process data, continuous process data, batch process data, historized data, event data, alarms data, analytics data, diagnostic data, user interface data, performance data, or another type of data corresponding to the one or more devices of the process plant operating to control the industrial process.

12. A system for securely transporting communications from a process plant, the system comprising:
a field gateway communicatively coupled to a network of the process plant and to a data diode configured to prevent two-way communications between the field gateway and an edge gateway, the field gateway including one or more processors and one or more non-transitory memories, the one or more non-transitory memories storing computer-executable instructions thereon that, when executed by the one or more processors, cause the field gateway to:
select a set of process plant data generated by one or more devices of the process plant while the process plant operates to control an industrial process;
obtain the selected set of process plant data in a first format from the one or more devices;
provide, to the edge gateway across the data diode, information indicative of an identity of the selected process plant data, the information indicative of the identity of the selected process plant data mapped from a configuration corresponding to the selected process plant data stored in the process plant;
convert the obtained, selected set of process data into a second format; and
publish, to the edge gateway across the data diode, the obtained, selected set of process plant data in the second format to the edge gateway in accordance with the information indicative of the identity of the selected process plant data including using a label different than a label utilized by the configuration corresponding to the selected process plant data.

13. The system of claim 12, wherein the selected set of process plant data is a first set of process plant data, and the computer-executable instructions, when executed by the one or more processors, cause the field gateway further to not transmit a second set of process plant data generated by the one or more devices of the process plant across the data diode to the edge gateway.

14. The system of claim 12, wherein the selected set of process plant data obtained in the first format from the one or more devices is included in a data stream streamed by the one or more devices to the field gateway via the process plant network.

15. The system of claim 14, wherein the process plant network is a data network other than a process control communication network via which the one or more devices communicate, utilizing an industrial communication protocol, data to control the process within the process plant.

16. The system of claim 14, wherein the selected set of process plant data obtained in the first format is a publication of the selected set of process plant data generated by the one or more devices, and the field gateway is a subscriber to the publication.

17. The system of claim 12, wherein the selected set of process plant data includes at least one of: a process parameter, a process variable, a function block, a module, an event, historized data, a piece of equipment, a display view, a device, or one or more other components of the process plant.

18. The system of claim 12, wherein a context of the selected process plant data includes the information indicative of the identity of the selected process plant data and information indicative of the one or more devices that generated the selected process plant data.

19. The system of claim 12, wherein the second format an IP format or another type of packet format.

20. The system of claim 12, wherein the data diode comprises a fiber optic link.

21. The system of claim 12, wherein the obtained, selected process plant data is published across the data diode via a session established between the field gateway and the edge gateway.

22. The system of claim 12, wherein the obtained, selected process plant data includes at least one of: run-time process data, continuous process data, batch process data, historized data, event data, alarms data, analytics data, diagnostic data, user interface data, performance data, or another type of data corresponding to the one or more devices of the process plant operating to control the industrial process.

* * * * *